(12) United States Patent
Le Grand

(10) Patent No.: US 9,058,677 B1
(45) Date of Patent: Jun. 16, 2015

(54) SYSTEM AND METHOD FOR REDUCING THE COMPLEXITY OF PERFORMING BROAD-PHASE COLLISION DETECTION ON GPUS

(75) Inventor: Scott M. Le Grand, Soquel, CA (US)

(73) Assignee: NVIDIA CORPORATION, Santa Clara, CA (US)

( * ) Notice: Subject to any disclaimer, the term of this patent is extended or adjusted under 35 U.S.C. 154(b) by 2315 days.

(21) Appl. No.: 11/954,753

(22) Filed: Dec. 12, 2007

(51) Int. Cl.
- G06T 15/00 (2011.01)
- G06T 15/30 (2011.01)
- G09G 5/00 (2006.01)
- G06F 15/08 (2006.01)
- G06T 13/00 (2011.01)
- G06T 17/00 (2006.01)

(52) U.S. Cl.
CPC ............... *G06T 17/00* (2013.01); *G06T 17/005* (2013.01); *G06T 2210/21* (2013.01)

(58) Field of Classification Search
None
See application file for complete search history.

(56) References Cited

U.S. PATENT DOCUMENTS

2005/0075154 A1 * 4/2005 Bordes et al. ............... 463/1

FOREIGN PATENT DOCUMENTS

| WO | WO 2008/127610 | 10/2008 |
| WO | WO 2008/127622 | 10/2008 |
| WO | WO 2008/127623 | 10/2008 |

OTHER PUBLICATIONS

Luque et al, Broad-Phase Collision Detection Using Semi-Adjusting BSP-trees, I3D '05 Proceedings of the 2005 symposium on Interactive 3D graphics and games, Copyright © 2005 by the Association for Computing Machinery, Inc.*
Kim et al, Fast Collision Detection Among Multiple Moving Spheres, IEEE Transactions on Visualization and Computer Graphics, vol. 4, No. 3, Jul.-Sep. 1998.*
Wan et al, A Parallel Collision Detection Algorithm Based on Hybrid Bounding Volume Hierarchy, CAD/Graphics'2001, Aug. 22-24, Kunming, International Academic Publishers.*
Eggers, et al., "Simultaneous Multithreading: A Platform for Next-Generation Processors," *IEEE Micro*, vol. 17, No. 5, pp. 12-19, Sep./Oct. 1997.
Moss, et al. "Toward Acceleration of RSA Using 3D Graphics Hardware," LNCS 4887, Dec. 2007, pp. 369-388.

* cited by examiner

*Primary Examiner* — Tize Ma
(74) *Attorney, Agent, or Firm* — Artegis Law Group, LLP

(57) ABSTRACT

One embodiment of the present invention sets forth a technique for efficiently performing broad phase collision detection using parallel spatial subdivision. The technique involves organizing candidate objects according to a hashed representation of each object centroid, constructing a cell identification (ID) array, sorting the cell ID array, creating a collision cell list, and traversing the collision cell list. The result is a candidate list of object groups that may collide, based on an initial assessment of spatial proximity. Whether a given pair of objects actually collides is determined by a precise narrow phase collision analysis.

28 Claims, 19 Drawing Sheets

SYSTEM AND METHOD FOR REDUCING THE COMPLEXITY OF PERFORMING BROAD-PHASE COLLISION DETECTION ON GPUS

CROSS-REFERENCE TO RELATED APPLICATIONS

This application claims the priority benefit of the U.S. provisional patent application having Ser. No. 60/953,169 and filed on Jul. 31, 2007. The subject matter of this provisional patent application is hereby incorporated herein by reference.

BACKGROUND OF THE INVENTION

1. Field of the Invention

Embodiments of the present invention relate generally to parallel processing and more specifically to a system and method for reducing the complexity of performing broad-phase collision detection on GPUs.

2. Description of the Related Art

Collision detection is an important component of computer-based physics simulation, computer-aided design, molecular modeling, and other applications. Collision detection determines whether two or more three-dimensional (3D) objects interact through a collision. Most efficient implementations of collision detection use a two-phase approach, involving a first "broad" phase and a second "narrow" phase. The broad phase efficiently generates a candidate list of object pairs that may potentially collide, while excluding object pairs that cannot possibly collide. Each object pair discarded in the broad phases saves potentially significant computational effort in the narrow phase. The narrow phase performs exact collision detection computations between each object pair in the candidate list and typically requires more computational effort per object pair than the broad phase.

One approach to performing the broad phase of collision detection is known in the art as "Sort and Sweep" and involves organizing the extreme dimensions of a bounding surface for each object along a sweep axis into a sorted list and then sweeping along the axis to determine which object pairs are candidates for narrow phase collision detection. The extreme dimensions include a beginning and ending point along the sweep axis. As the sweep progresses through the sorted list, each beginning point causes the corresponding object to be added to an active list, and each ending point causes the corresponding object to be removed from the active list. The objects currently in the active list when a new object is added are candidates for narrow phase collision detection. Collision detection over a set of 3D objects may be performed in each dimension separately.

With the advent of multi-processing systems, such as graphics processing units (GPUs) and multi-core central processing units (CPUs), the performance of certain processing tasks has been significantly improved by dividing the overall workload across multiple, simultaneously executing processors configured for parallel processing. For example, graphics rendering has generally benefited from parallel processing on GPU-based system. However, certain other types of processing tasks, such as collision detection in physics simulations, have not benefited from parallel processing because known algorithms for performing collision detection include inherently serial operations. For example, the sequential sweep portion of the sort and sweep algorithm must process every object sequentially to properly maintain the active list, which is an essential element of the algorithm.

In an application that processes large numbers of potentially colliding objects, the relative inefficiency of the broad phase of the collision detection algorithm can result in significant performance bottle necks. In an application that combines tasks that benefit from parallel processing, such as graphics rendering, with collision detection tasks, the inefficiency associated with conventional, serialized collision detection can cripple the overall performance of the application, despite the benefits of parallel processing realized for a certain subset of tasks.

As the foregoing illustrates, what is needed in the art is a technique for performing efficient collision detection on a multi-processing system.

SUMMARY OF THE INVENTION

One embodiment of the present invention sets forth a method for performing a collision detection analysis for a plurality of graphics objects. The method includes the steps of initializing a cell identifier (ID) array that includes memory space for entries corresponding to a first bounding sphere associated with a first graphics object and entries corresponding to a second bounding sphere associated with a second graphics object, generating an unsorted cell ID array that includes one or more entries corresponding to the first bounding sphere and one or more entries corresponding to the second bounding sphere, wherein each entry includes a cell ID number and an object ID, generating a sorted cell ID array from the unsorted cell ID array based on the cell ID number associated with each entry, generating a collision cell list based on the sorted cell ID array, and traversing the collision cell list with one or more threads, in one pass, to perform a narrow phase collision detection analysis on each collision cell included in the collision cell list.

One advantage of the disclosed method is that it enables broad phase collision detection to be performed using parallel spatial subdivision. The method may be implemented using one or more parallel processing units, each configured to execute multiple threads in parallel. Consequently, computational efficiency may be substantially increased relative to prior art techniques.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

System Overview

Figure 1:
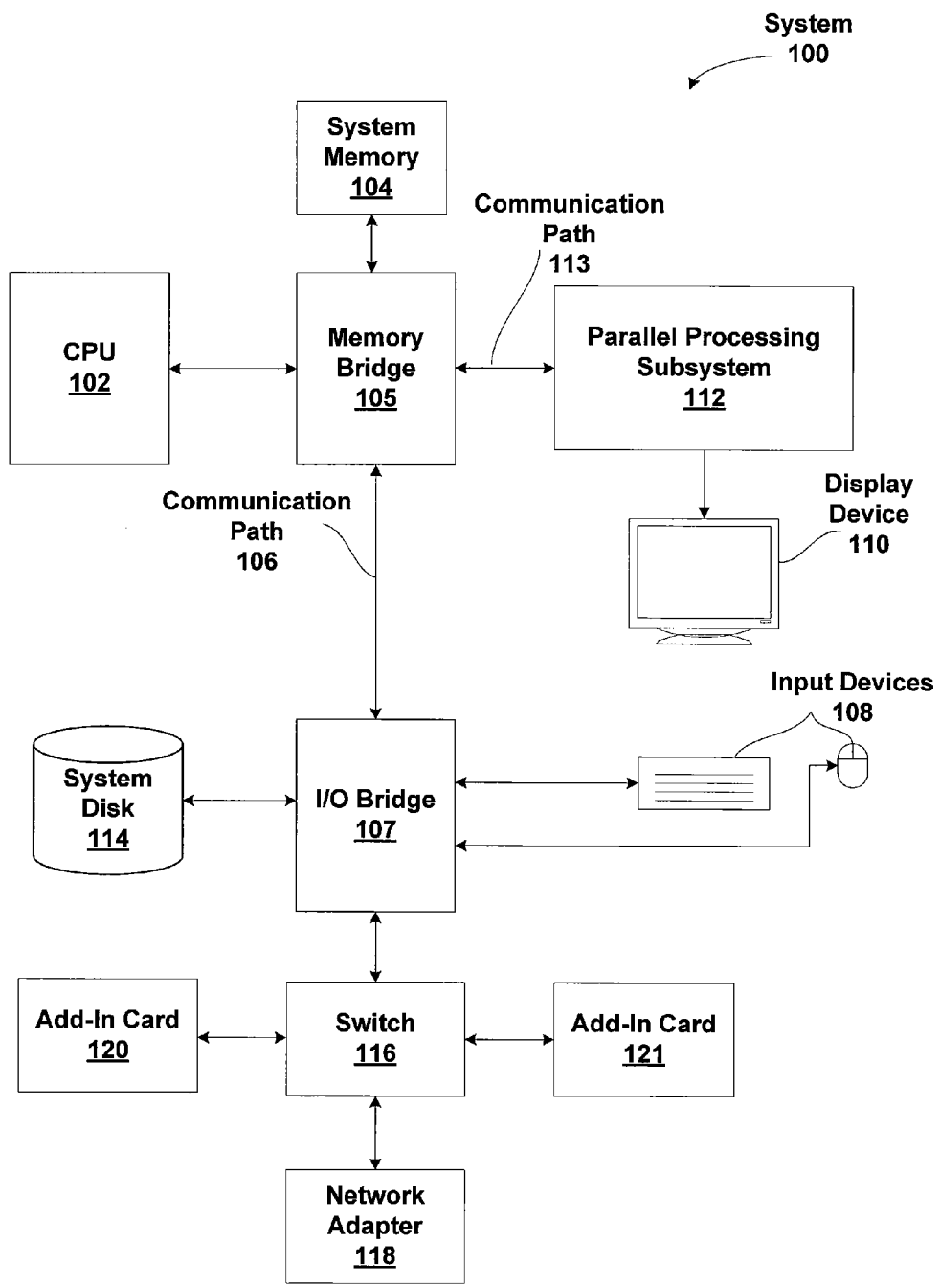
FIG. 1 is a block diagram illustrating a computer system configured to implement one or more aspects of the present invention.

FIG. 1 is a block diagram illustrating a computer system 100 configured to implement one or more aspects of the present invention. Computer system 100 includes a central processing unit (CPU) 102 and a system memory 104 communicating via a bus path that includes a memory bridge 105. Memory bridge 105, which may be, e.g., a Northbridge chip, is connected via a bus or other communication path 106 (e.g., a HyperTransport link) to an I/O (input/output) bridge 107. I/O bridge 107, which may be, e.g., a Southbridge chip, receives user input from one or more user input devices 108 (e.g., keyboard, mouse) and forwards the input to CPU 102 via path 106 and memory bridge 105. A parallel processing subsystem 112 is coupled to memory bridge 105 via a bus or other communication path 113 (e.g., a PCI Express, Accelerated Graphics Port, or HyperTransport link); in one embodiment parallel processing subsystem 112 is a graphics subsystem that delivers pixels to a display device 110 (e.g., a conventional CRT or LCD based monitor). A system disk 114 is also connected to I/O bridge 107. A switch 116 provides connections between I/O bridge 107 and other components such as a network adapter 118 and various add-in cards 120 and 121. Other components (not explicitly shown), including USB or other port connections, CD drives, DVD drives, film recording devices, and the like, may also be connected to I/O bridge 107. Communication paths interconnecting the various components in FIG. 1 may be implemented using any suitable protocols, such as PCI (Peripheral Component Interconnect), PCI Express (PCI-E), AGP (Accelerated Graphics Port), HyperTransport, or any other bus or point-to-point communication protocol(s), and connections between different devices may use different protocols as is known in the art.

In one embodiment, the parallel processing subsystem 112 incorporates circuitry optimized for graphics and video processing, including, for example, video output circuitry, and constitutes a graphics processing unit (GPU). In another embodiment, the parallel processing subsystem 112 incorporates circuitry optimized for general purpose processing, while preserving the underlying computational architecture, described in greater detail herein. In yet another embodiment, the parallel processing subsystem 112 may be integrated with one or more other system elements, such as the memory bridge 105, CPU 102, and I/O bridge 107 to form a system on chip (SoC).

Figure 2:
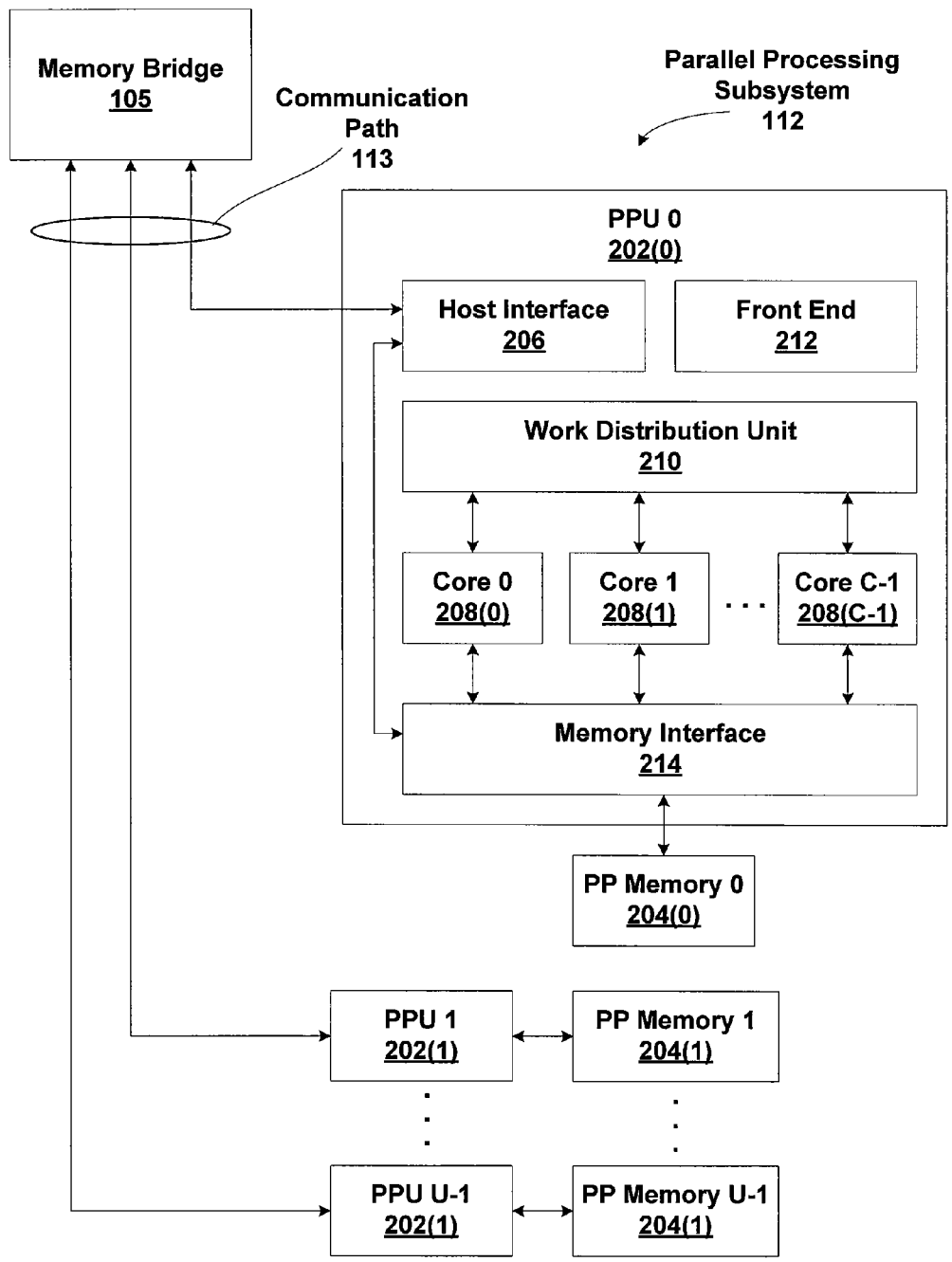
FIG. 2 illustrates a parallel processing subsystem, according to one embodiment of the present invention.

FIG. 2 illustrates a parallel processing subsystem 112, according to one embodiment of the invention. Parallel processing subsystem 112 includes one or more parallel processing units (PPUs) 202, each of which is coupled to a local parallel processing (PP) memory 204. In general, a parallel processing subsystem includes a number U of PPUs, where U≥1. (Herein, multiple instances of like objects are denoted with reference numbers identifying the object and parenthetical numbers identifying the instance where needed.) PPUs 202 and PP memories 204 may be implemented, e.g., using one or more integrated circuit devices such as programmable processors, application specific integrated circuits (ASICs), and memory devices.

As shown in detail for PPU 202(0), each PPU 202 includes a host interface 206 that communicates with the rest of system 100 via communication path 113, which connects to memory bridge 105 (or, in one alternative embodiment, directly to CPU 102). In one embodiment, communication path 113 is a PCI-E link, in which dedicated lanes are allocated to each PPU 202 as is known in the art. Other communication paths may also be used. Host interface 206 generates packets (or other signals) for transmission on communication path 113 and also receives all incoming packets (or other signals) from communication path 113 and directs them to appropriate components of PPU 202. For example, commands related to processing tasks may be directed to a front end unit 212 while commands related to memory operations (e.g., reading from or writing to PP memory 204) may be directed to a memory interface 214. Host interface 206, front end unit 212, and memory interface 214 may be of generally conventional design, and a detailed description is omitted as not being critical to the present invention.

Each PPU 202 advantageously implements a highly parallel processor. As shown in detail for PPU 202(0), a PPU 202 includes a number C of cores 208, where C≥1. Each processing core 208 is capable of executing a large number (e.g., tens or hundreds) of threads concurrently, where each thread is an instance of a program; one embodiment of a multithreaded processing core 208 is described below. Cores 208 receive processing tasks to be executed via a work distribution unit 210, which receives commands defining processing tasks from a front end unit 212. Work distribution unit 210 can implement a variety of algorithms for distributing work. For instance, in one embodiment, work distribution unit 210 receives a "ready" signal from each core 208 indicating whether that core has sufficient resources to accept a new processing task. When a new processing task arrives, work distribution unit 210 assigns the task to a core 208 that is asserting the ready signal; if no core 208 is asserting the ready signal, work distribution unit 210 holds the new processing task until a ready signal is asserted by a core 208. Those skilled in the art will recognize that other algorithms may also be used and that the particular manner in which work distribution unit 210 distributes incoming processing tasks is not critical to the present invention.

Cores 208 communicate with memory interface 214 to read from or write to various external memory devices. In one embodiment, memory interface 214 includes an interface adapted to communicate with local PP memory 204, as well as a connection to host interface 206, thereby enabling the cores to communicate with system memory 104 or other memory that is not local to PPU 202. Memory interface 214 can be of generally conventional design, and a detailed description is omitted.

Cores 208 can be programmed to execute processing tasks relating to a wide variety of applications, including but not limited to linear and nonlinear data transforms, filtering of video and/or audio data, modeling operations (e.g., applying laws of physics to determine position, velocity and other attributes of objects), image rendering operations (e.g., vertex shader, geometry shader, and/or pixel shader programs), and so on. PPUs 202 may transfer data from system memory 104 and/or local PP memories 204 into internal (on-chip) memory, process the data, and write result data back to system memory 104 and/or local PP memories 204, where such data can be accessed by other system components, including, e.g., CPU 102 or another parallel processing subsystem 112.

Referring again to FIG. 1, in some embodiments, some or all of PPUs 202 in parallel processing subsystem 112 are graphics processors with rendering pipelines that can be configured to perform various tasks related to generating pixel data from graphics data supplied by CPU 102 and/or system memory 104 via memory bridge 105 and bus 113, interacting with local PP memory 204 (which can be used as graphics memory including, e.g., a conventional frame buffer) to store and update pixel data, delivering pixel data to display device 110, and the like. In some embodiments, PP subsystem 112 may include one or more PPUs 202 that operate as graphics processors and one or more other PPUs 202 that are used for general-purpose computations. The PPUs may be identical or different, and each PPU may have its own dedicated PP memory device(s) or no dedicated PP memory device(s).

In operation, CPU 102 is the master processor of system 100, controlling and coordinating operations of other system components. In particular, CPU 102 issues commands that control the operation of PPUs 202. In some embodiments, CPU 102 writes a stream of commands for each PPU 202 to a pushbuffer (not explicitly shown in FIG. 1), which may be located in system memory 104, PP memory 204, or another storage location accessible to both CPU 102 and PPU 202. PPU 202 reads the command stream from the pushbuffer and executes commands asynchronously with operation of CPU 102.

It will be appreciated that the system shown herein is illustrative and that variations and modifications are possible.

The connection topology, including the number and arrangement of bridges, may be modified as desired. For instance, in some embodiments, system memory 104 is connected to CPU 102 directly rather than through a bridge, and other devices communicate with system memory 104 via memory bridge 105 and CPU 102. In other alternative topologies, parallel processing subsystem 112 is connected to I/O bridge 107 or directly to CPU 102, rather than to memory bridge 105. In still other embodiments, I/O bridge 107 and memory bridge 105 might be integrated into a single chip. The particular components shown herein are optional; for instance, any number of add-in cards or peripheral devices might be supported. In some embodiments, switch 116 is eliminated, and network adapter 118 and add-in cards 120, 121 connect directly to I/O bridge 107.

The connection of PPU 202 to the rest of system 100 may also be varied. In some embodiments, PP system 112 is implemented as an add-in card that can be inserted into an expansion slot of system 100. In other embodiments, a PPU 202 can be integrated on a single chip with a bus bridge, such as memory bridge 105 or I/O bridge 107. In still other embodiments, some or all elements of PPU 202 may be integrated on a single chip with CPU 102.

A PPU may be provided with any amount of local PP memory, including no local memory, and may use local memory and system memory in any combination. For instance, a PPU 202 can be a graphics processor in a unified memory architecture (UMA) embodiment; in such embodiments, little or no dedicated graphics (PP) memory is provided, and PPU 202 would use system memory exclusively or almost exclusively. In UMA embodiments, a PPU may be integrated into a bridge chip or processor chip or provided as a discrete chip with a high-speed link (e.g., PCI-E) connecting the PPU to system memory, e.g., via a bridge chip.

As noted above, any number of PPUs can be included in a parallel processing subsystem. For instance, multiple PPUs can be provided on a single add-in card, or multiple add-in cards can be connected to communication path 113, or one or more of the PPUs could be integrated into a bridge chip. The PPUs in a multi-PPU system may be identical to or different from each other; for instance, different PPUs might have different numbers of cores, different amounts of local PP memory, and so on. Where multiple PPUs are present, they may be operated in parallel to process data at higher throughput than is possible with a single PPU.

Systems incorporating one or more PPUs may be implemented in a variety of configurations and form factors, including desktop, laptop, or handheld personal computers, servers, workstations, game consoles, embedded systems, and so on.

Core Overview

Figure 3:
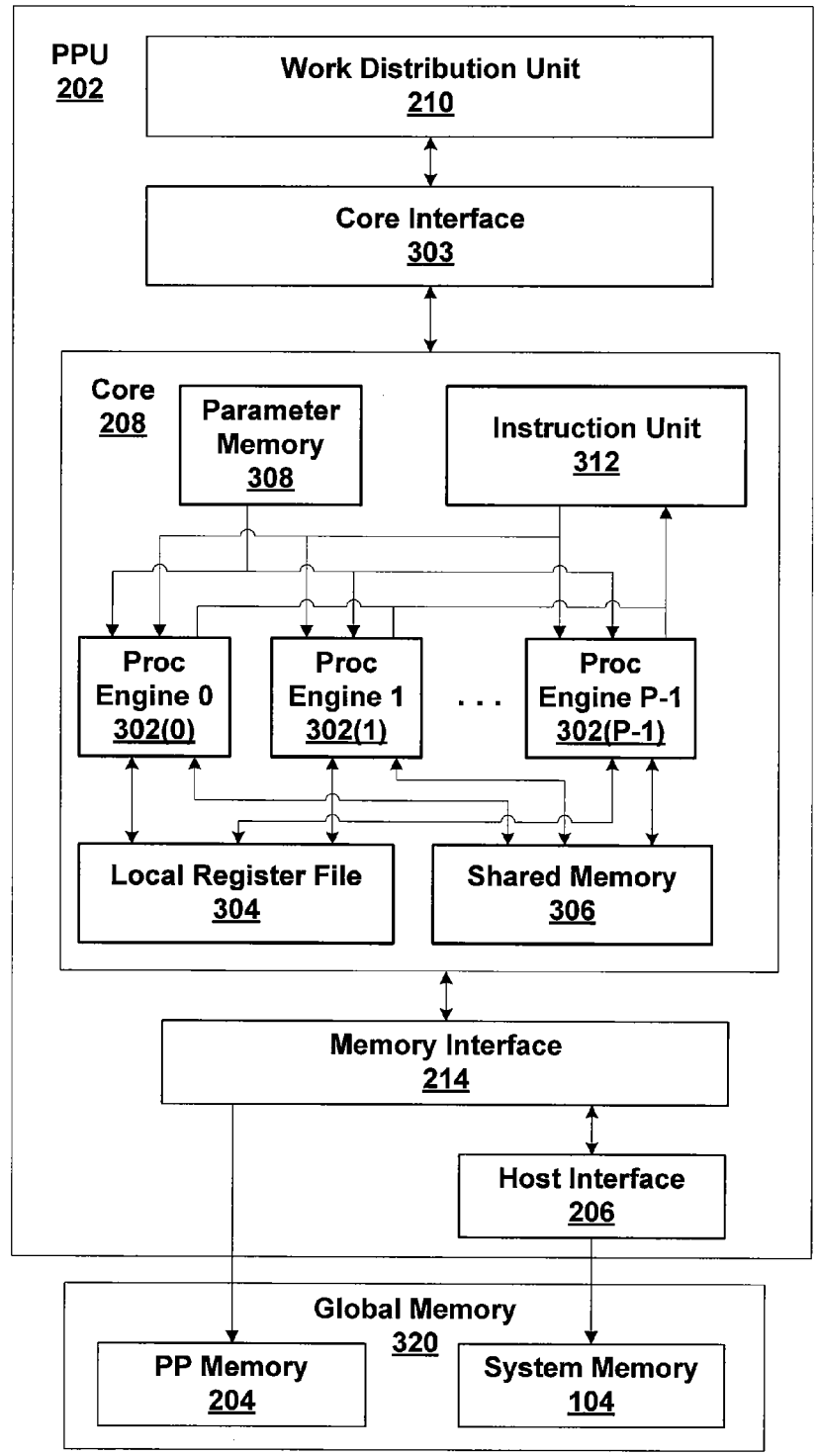
FIG. 3 is a block diagram of a parallel processing unit for the parallel processing subsystem of FIG. 2, according to one embodiment of the present invention.

FIG. 3 is a block diagram of a parallel processing unit 220 for the parallel processing subsystem 112 of FIG. 2, according to one embodiment of the present invention. PPU 202 includes a core 208 (or multiple cores 208) configured to execute a large number of threads in parallel, where the term "thread" refers to an instance of a particular program executing on a particular set of input data. In some embodiments, single-instruction, multiple-data (SIMD) instruction issue techniques are used to support parallel execution of a large number of threads without providing multiple independent instruction units.

As is well known, a SIMD core 208 executes a single instruction on different data across a plurality of parallel processing engines 302 included in the core 208. Thus, for example, the core 208 is configured to execute a series of common instructions on the parallel processing engines 302 within the core 208. The series of instructions to a single parallel processing engine 302 constitutes a thread, as defined previously, and the collection of a certain number of concurrently executing threads among the parallel processing engines 302 within a core 208 is referred to herein as a "thread group." Additionally, a plurality of thread groups may be active (in different phases of execution) at the same time on a core 208. This collection of thread groups is referred to herein as a "cooperative thread array" ("CTA").

The size of a particular CTA is equal to m*k, where k is the number of concurrently executing threads in a thread group and is also an integer multiple of the number of parallel processing engines 302 in a core 208, and m is the number of thread groups simultaneously active on the core 208. The size of a CTA is generally determined by the amount of hardware resources, such as memory or registers, available to the CTA.

In one embodiment, each core 208 includes an array of P (e.g., 8, 16, etc.) parallel processing engines 302 configured to receive SIMD instructions from a single instruction unit 312. Each processing engine 302 advantageously includes an identical set of functional units (e.g., arithmetic logic units, etc.). The functional units may be pipelined, allowing a new instruction to be issued before a previous instruction has finished, as is known in the art. Any combination of functional units may be provided. In one embodiment, the functional units support a variety of operations including integer and floating point arithmetic (e.g., addition and multiplication), comparison operations, Boolean operations (AND, OR, XOR), bit-shifting, and computation of various algebraic functions (e.g., planar interpolation, trigonometric, exponential, and logarithmic functions, etc.); and the same functional-unit hardware can be leveraged to perform different operations.

Each processing engine 302 uses space in a local register file (LRF) 304 for storing its local input data, intermediate results, and the like. In one embodiment, local register file 304 is physically or logically divided into P lanes, each having some number of entries (where each entry might store, e.g., a 32-bit word). One lane is assigned to each processing engine 302, and corresponding entries in different lanes can be populated with data for different threads executing the same program to facilitate SIMD execution. In some embodiments, each processing engine 302 can only access LRF entries in the lane assigned to it. The total number of entries in local register file 304 is advantageously large enough to support multiple concurrent threads per processing engine 302.

Each processing engine 302 also has access to an on-chip shared memory 306 that is shared among all of the processing engines 302 in core 208. Shared memory 306 may be as large as desired, and in some embodiments, any processing engine 302 can read to or write from any location in shared memory 306 with equally low latency (e.g., comparable to accessing local register file 304). In some embodiments, shared memory 306 is implemented as a shared register file; in other embodiments, shared memory 306 can be implemented using shared cache memory.

In addition to shared memory 306, some embodiments also provide additional on-chip parameter memory and/or cache (s) 308, which may be implemented, e.g., as a conventional RAM or cache. Parameter memory/cache 308 can be used, e.g., to hold state parameters and/or other data (e.g., various constants) that may be needed by multiple threads. Processing engines 302 also have access via memory interface 214 to off-chip "global" memory 320, which can include, e.g., PP memory 204 and/or system memory 104, with system memory 104 being accessible by memory interface 214 via host interface 206 as described above. It is to be understood that any memory external to PPU 202 may be used as global memory 320. Processing engines 302 can be coupled to memory interface 214 via an interconnect (not explicitly shown) that allows any processing engine 302 to access global memory 320.

In one embodiment, each processing engine 302 is multi-threaded and can execute up to some number G (e.g., 24) of threads concurrently, e.g., by maintaining current state information associated with each thread in a different portion of its assigned lane in local register file 304. Processing engines 302 are advantageously designed to switch rapidly from one thread to another so that instructions from different threads can be issued in any sequence without loss of efficiency.

Instruction unit 312 is configured such that, for any given processing cycle, the same instruction (INSTR) is issued to all P processing engines 302. Thus, at the level of a single clock cycle, core 208 implements a P-way SIMD microarchitecture. Since each processing engine 302 is also multi-threaded, supporting up to G threads concurrently, core 208 in this embodiment can have up to P*G threads executing concurrently. For instance, if P=16 and G=24, then core 208 supports up to 384 concurrent threads.

Because instruction unit 312 issues the same instruction to all P processing engines 302 in parallel, core 208 is advantageously used to process threads in "SIMD thread groups." As used herein, a "SIMD thread group" refers to a group of up to P threads of execution of the same program on different input data, with one thread of the group being assigned to each processing engine 302. A SIMD thread group may include fewer than P threads, in which case some of processing engines 302 will be idle during cycles when that SIMD thread group is being processed. A SIMD thread group may also include more than P threads, in which case processing will take place over consecutive clock cycles. Since each processing engine 302 can support up to G threads concurrently, it follows that up to G SIMD thread groups can be executing in core 208 at any given time.

On each clock cycle, one instruction is issued to all P threads making up a selected one of the G SIMD thread groups. To indicate which thread is currently active, an "active mask" for the associated thread may be included with the instruction. Processing engine 302 uses the active mask as a context identifier, e.g., to determine which portion of its assigned lane in local register file 304 should be used when executing the instruction. Thus, in a given cycle, all processing engines 302 in core 208 are nominally executing the same instruction for different threads in the same SIMD thread group. (In some instances, some threads in a SIMD thread group may be temporarily idle, e.g., due to conditional or predicated instructions, divergence at branches in the program, or the like.)

Operation of core 208 is advantageously controlled via a core interface 303. In some embodiments, core interface 303 receives data to be processed (e.g., primitive data, vertex data, and/or pixel data) as well as state parameters and commands defining how the data is to be processed (e.g., what program is to be executed) from work distribution unit 210. Core interface 303 can load data to be processed into shared memory 306 and parameters into parameter memory 308. Core interface 303 also initializes each new thread or SIMD thread group in instruction unit 312, then signals instruction unit 312 to begin executing the threads. When execution of a thread or SIMD thread group is completed, core 208 advantageously notifies core interface 303. Core interface 303 can then initiate other processes, e.g., to retrieve output data from shared memory 306 and/or to prepare core 208 for execution of additional threads or SIMD thread groups.

It will be appreciated that the core architecture described herein is illustrative and that variations and modifications are possible. Any number of processing engines may be included. In some embodiments, each processing engine has its own local register file, and the allocation of local register file entries per thread can be fixed or configurable as desired. Further, while only one core 208 is shown, a PPU 202 may include any number of cores 208, which are advantageously of identical design to each other so that execution behavior does not depend on which core 208 receives a particular processing task. Each core 208 advantageously operates independently of other cores 208 and has its own processing engines, shared memory, and so on.

Thread Groups and Cooperative Thread Arrays

In some embodiments, multithreaded processing core 208 of FIG. 3 can execute general-purpose computations using thread groups. As described previously, a thread group consists of a number (n0) of threads that concurrently execute the same program on an input data set to produce an output data set. Each thread in the thread group is assigned a unique thread identifier ("thread ID") that is accessible to the thread during its execution. The thread ID controls various aspects of the thread's processing behavior. For instance, a thread ID may be used to determine which portion of the input data set a thread is to process and/or to determine which portion of an output data set a thread is to produce or write.

In some embodiments, the thread groups are arranged as "cooperative thread arrays," or CTAs. Each CTA is a group of threads that concurrently execute the same program (referred to herein as a "CTA program") on an input data set to produce an output data set. In a CTA, the threads can cooperate by sharing data with each other in a manner that depends on thread ID. For instance, in a CTA, data can be produced by one thread and consumed by another. In some embodiments, synchronization instructions can be inserted into the CTA program code at points where data is to be shared to ensure that the data has actually been produced by the producing thread before the consuming thread attempts to access it. The extent, if any, of data sharing among threads of a CTA is determined by the CTA program; thus, it is to be understood that in a particular application that uses CTAs, the threads of a CTA might or might not actually share data with each other, depending on the CTA program.

In some embodiments, threads in a CTA share input data and/or intermediate results with other threads in the same CTA using shared memory 306 of FIG. 3. For example, a CTA program might include an instruction to compute an address in shared memory 306 to which particular data is to be written, with the address being a function of thread ID. Each thread computes the function using its own thread ID and writes to the corresponding location. The address function is advantageously defined such that different threads write to different locations; as long as the function is deterministic, the location written to by any thread is predictable. The CTA program can also include an instruction to compute an address in shared memory 306 from which data is to be read, with the address being a function of thread ID. By defining suitable functions and providing synchronization techniques, data can be written to a given location in shared memory 306 by one thread of a CTA and read from that location by a different thread of the same CTA in a predictable manner. Consequently, any desired pattern of data sharing among threads can be supported, and any thread in a CTA can share data with any other thread in the same CTA.

CTAs (or other types of thread groups) are advantageously employed to perform computations that lend themselves to a data-parallel decomposition. As used herein, a "data-parallel decomposition" includes any situation in which a computational problem is solved by executing the same algorithm multiple times in parallel on input data to generate output data; for instance, one common instance of data-parallel decomposition involves applying the same processing algorithm to different portions of an input data set in order to generate different portions an output data set. Examples of problems amenable to data-parallel decomposition include matrix algebra, linear and/or nonlinear transforms in any number of dimensions (e.g., Fast Fourier Transforms), and various filtering algorithms including convolution filters in any number of dimensions, separable filters in multiple dimensions, and so on. The processing algorithm to be applied to each portion of the input data set is specified in the CTA program, and each thread in a CTA executes the same CTA program on one portion of the input data set. A CTA program can implement algorithms using a wide range of mathematical and logical operations, and the program can include conditional or branching execution paths and direct and/or indirect memory access.

For example, as is known in the art, an array of data values (e.g., pixels) can be filtered using a 2-D kernel-based filter algorithm, in which the filtered value of each pixel is determined based on the pixel and its neighbors. In some instances the filter is separable and can be implemented by computing a first pass along the rows of the array to produce an intermediate array, then computing a second pass along the columns of the intermediate array. In one CTA implementation of a separable 2-D filter, the threads of the CTA load the input data set (or a portion thereof) into shared memory 306, then synchronize. Each thread performs the row-filter for one point of the data set and writes the intermediate result to shared memory 306. After all threads have written their row-filter results to shared memory 306 and have synchronized at that point, each thread performs the column filter for one point of the data set. In the course of performing the column filter, each thread reads the appropriate row-filter results from shared memory 306, and a thread may read row-filter results that were written by any thread of the CTA. The threads write their column-filter results to shared memory 306. The resulting data array can be stored to global memory or retained in shared memory 306 for further processing. Where shared memory 306 can be accessed with lower latency and/or greater bandwidth than global memory, storing intermediate results in shared memory 306 advantageously improves processor throughput.

In one embodiment, a driver program executing on CPU 102 of FIG. 1 writes commands defining the CTA to a pushbuffer (not explicitly shown) in memory (e.g., system memory 104), from which the commands are read by a PPU 202. The commands advantageously are associated with state parameters such as the number of threads in the CTA, the location in global memory 320 of an input data set to be processed using the CTA, the location in global memory 320 of the CTA program to be executed, and the location in global memory 320 where output data is to be written. The state parameters may be written to the pushbuffer together with the commands. In response to the commands, core interface 303 loads the state parameters into core 208 (e.g., into parameter memory 308), then begins launching threads until the number of threads specified in the CTA parameters have been launched. In one embodiment, core interface 303 assigns thread IDs sequentially to threads as they are launched. More generally, since all threads in a CTA execute the same program in the same core 208, any thread can be assigned any thread ID, as long as each valid thread ID is assigned to only one thread. Any unique identifier (including but not limited to numeric identifiers) can be used as a thread ID. In one embodiment, if a CTA includes some number ($n_0$) of threads, thread IDs are simply sequential (one-dimensional) index values from 0 to $n_0-1$. In other embodiments, multidimensional indexing schemes can be used. It should be noted that as long as data sharing is controlled by reference to thread IDs, the particular assignment of threads to processing engines will not affect the result of the CTA execution. Thus, a CTA program can be independent of the particular hardware on which it is to be executed.

Broad Phase Collision Detection

Figure 4:
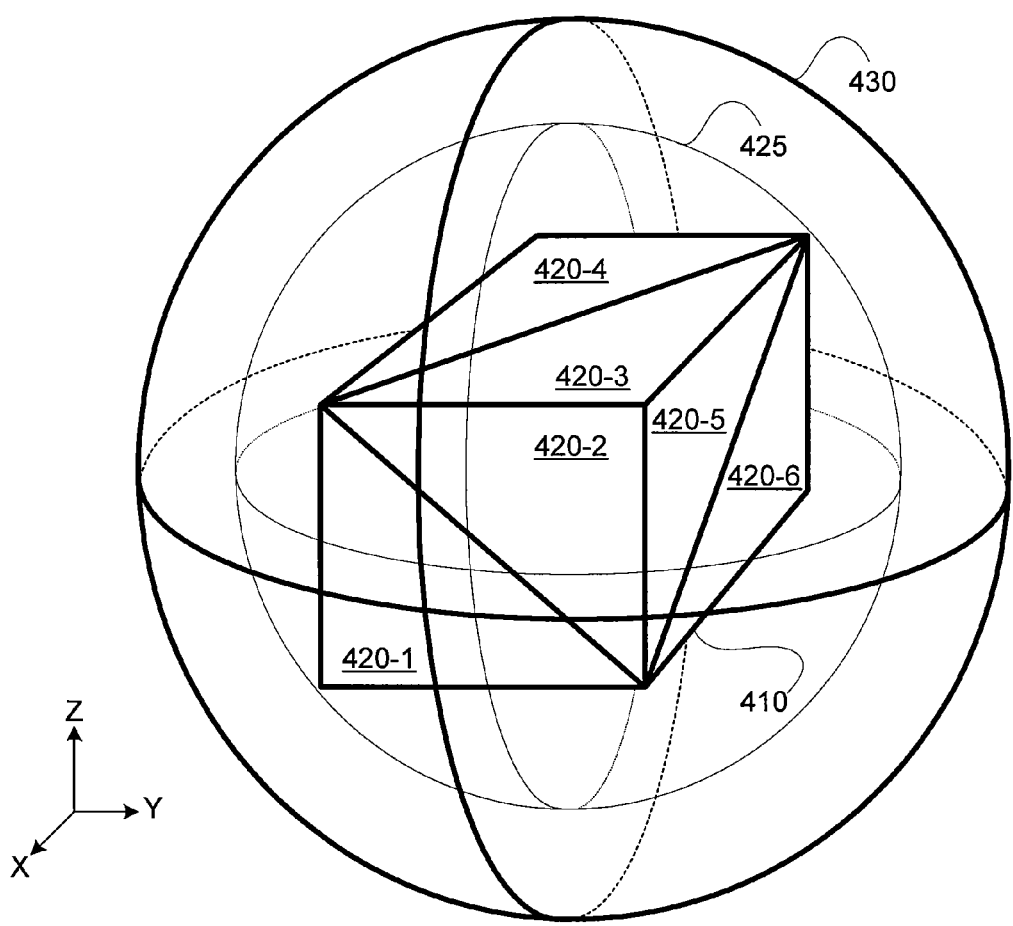
FIG. 4 illustrates a three-dimensional (3D) object and an associated bounding sphere, according to one embodiment of the present invention.

FIG. 4 illustrates a three-dimensional (3D) object 410 and an associated bounding sphere 430, according to one embodiment of the present invention. The 3D object 410 is composed of triangles 420. An object radius sphere 425 is positioned and sized, using a minimum radius, to fully encompass the 3D object 410. The object radius sphere 425 is centered inside the bounding sphere 430, which is defined to have a radius of the square root of two times that of the object radius sphere 425.

Figure 5:
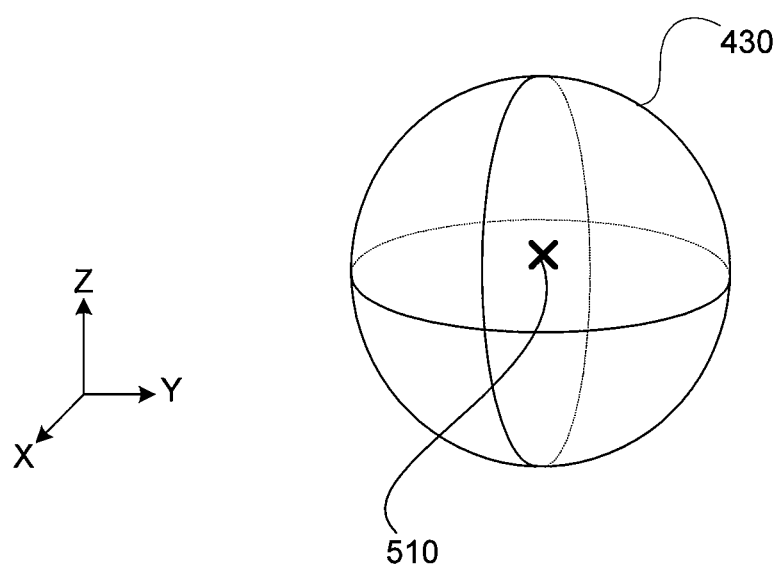
FIG. 5 illustrates the bounding sphere and an associated centroid, according to one embodiment of the present invention.

FIG. 5 illustrates the bounding sphere 430 and an associated centroid 510, according to one embodiment of the present invention. In one embodiment, the centroid of the bounding sphere 430 defines the associated centroid 510.

Figure 6A:
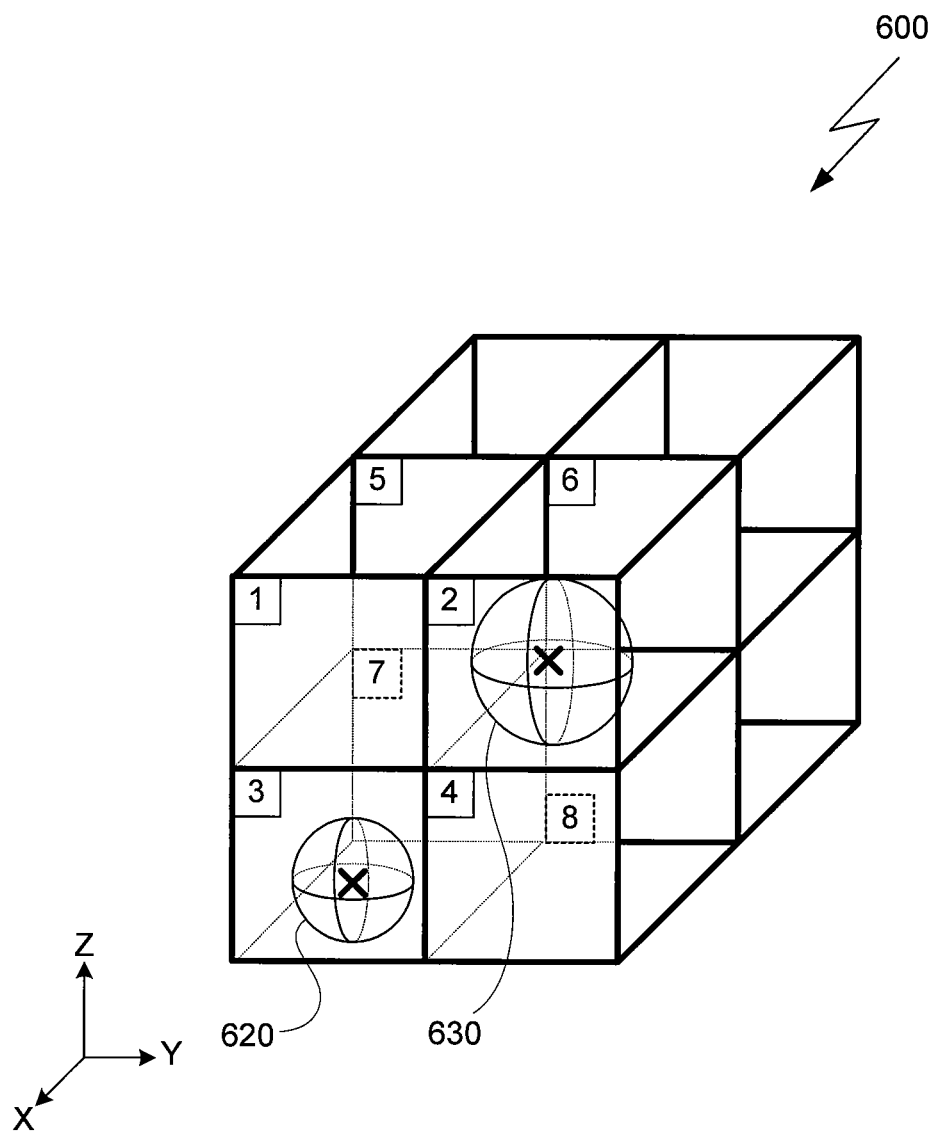
FIG. 6A illustrates two bounding spheres within a two-by-two-by-two array of 3D cells, according to one embodiment of the present invention.

FIG. 6A illustrates two bounding spheres within a two-by-two-by-two array of 3D cells 600, according to one embodiment of the present invention. Each cell is associated with one of eight positions in the array, where each cell is larger than the largest object being processed. In one embodiment, each cell is a uniformly sized cube that is 1.5 times larger in each dimension than the largest bounding sphere 430 being processed. As shown, each cell is labeled from 1 to 8, according to position, or "type," in the two-by-two-by-two pattern. Bounding sphere 620 is located completely within cell 3, while bounding sphere 630 is nearly centered within the eight cells. A 3D graphics scene may be divided into a repeating pattern of such two-by-two-by-two arrays of 3D cells.

Figure 6B:
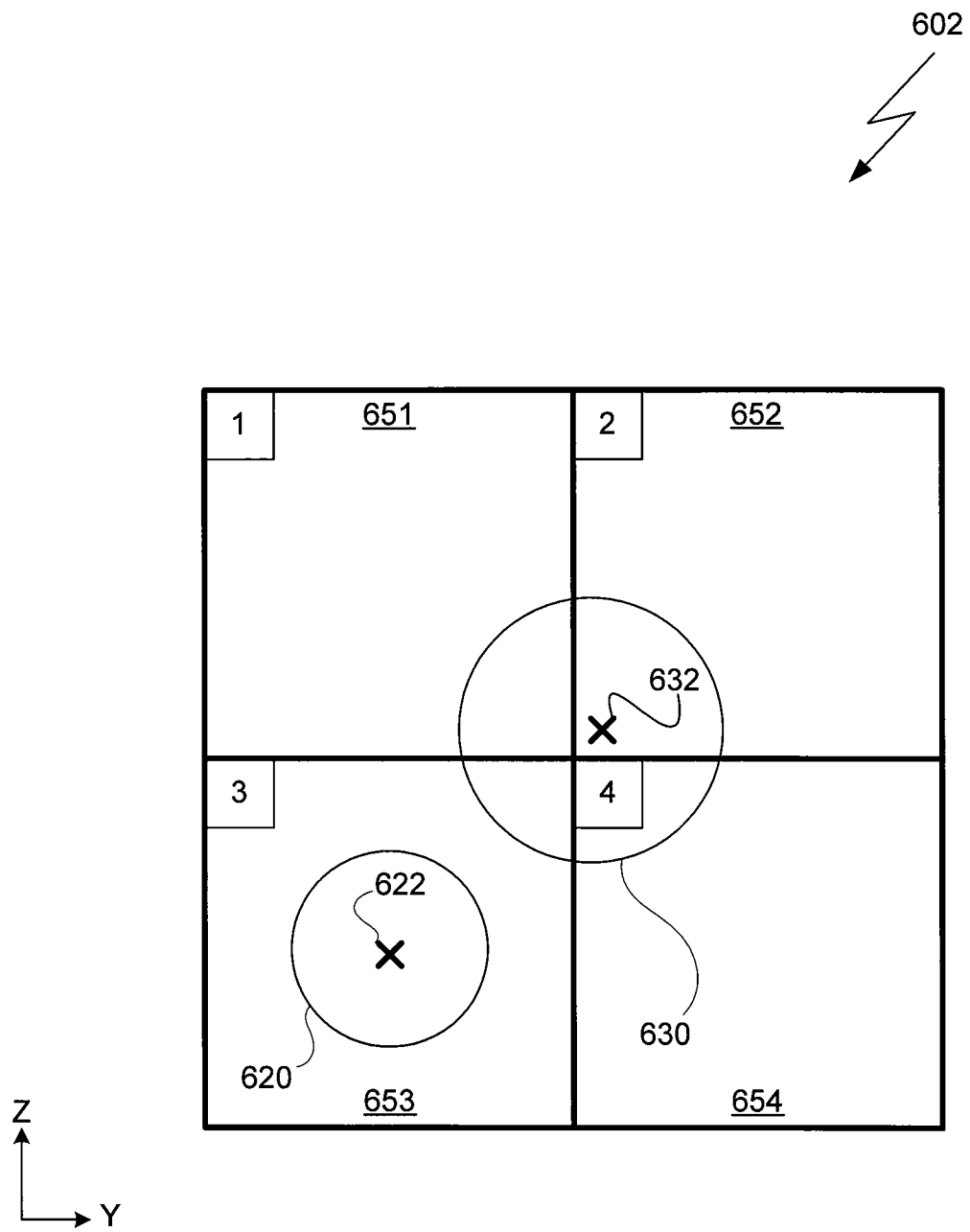
FIG. 6B depicts a projection of the two bounding spheres on a two-by-two array of cells in the Y-Z plane, according to one embodiment of the present invention.

FIG. 6B depicts a projection of the two bounding spheres 620, 630 on a two-by-two array of cells 602 in the Y-Z plane, according to one embodiment of the present invention. Each bounding sphere 620 and 630 includes a respective centroid 622 and 632. A cell that encompasses a given bounding sphere centroid is the "home cell" for the bounding sphere. Cells surrounding the home cell that also include portions of the bounding sphere are "phantom cells" of the bounding sphere. For example, cell 652 is the home cell of bounding sphere 630 because cell 652 encompasses centroid 632 of bounding sphere 630. Cells 651, 653, and 654 are phantom cells of bounding sphere 630 because each cell 651, 653, and 654 includes at least a portion of bounding sphere 630 without including centroid 632. Bounding sphere 620 is completely encompassed within cell 653, making cell 653 the home cell of bounding sphere 620. No phantom cells are associated with bounding sphere 620. In a two-dimensional system, each object may have one home cell and up to three phantom cells. In a 3D system, each object may have one home cell and up to seven phantom cells.

Figure 7:
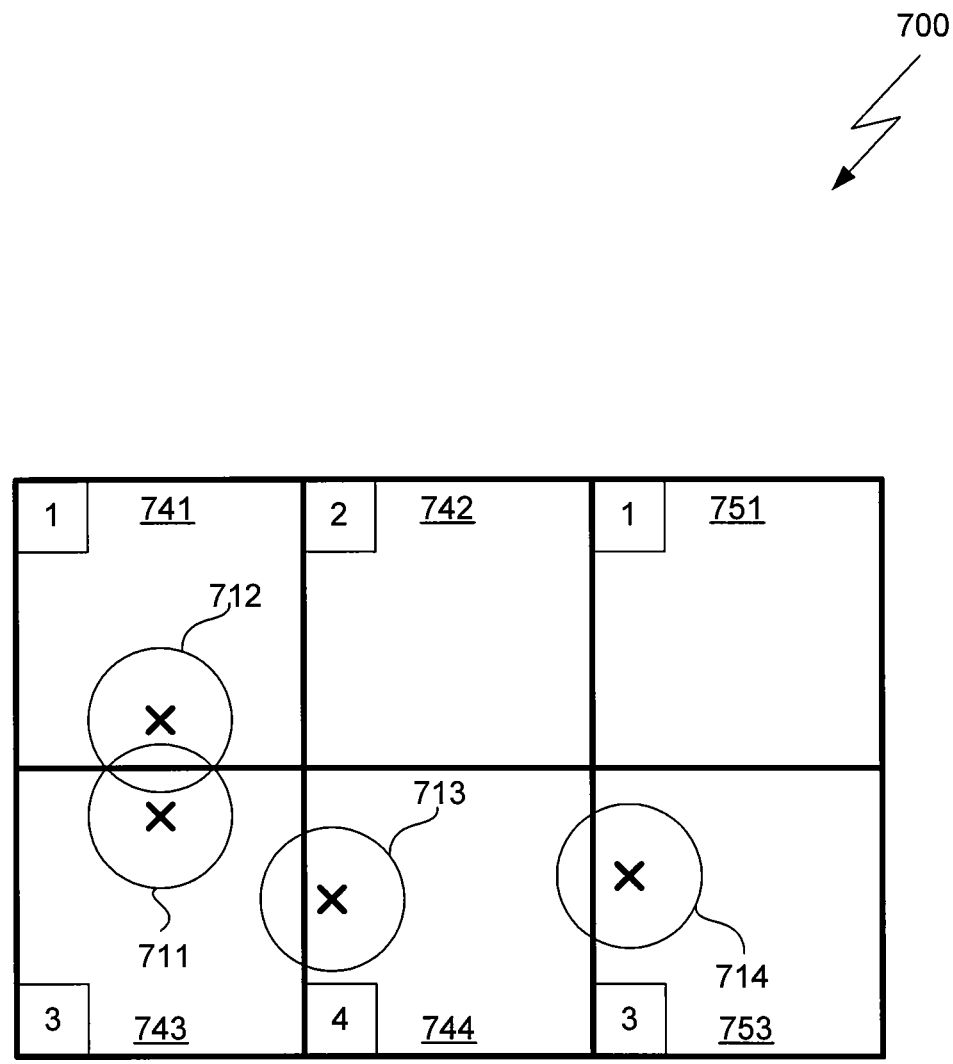
FIG. 7 illustrates the concept of home cells and phantom cells in a two-dimensional configuration, according to one embodiment of the present invention.

FIG. 7 illustrates the concept of home cells and phantom cells in a two-dimensional configuration 700, according to one embodiment of the present invention. As shown, a two-dimensional grid of cells includes bounding spheres 711, 712, 713, and 714. The centroid of bounding sphere 711 is located in cell 743, making cell 743 the home cell of bounding sphere 711. A portion of bounding sphere 711 is also located in cell 741, making cell 741 a phantom cell of bounding sphere 711. The centroid of bounding sphere 712 is located in cell 741, making cell 741 the home cell of bounding sphere 712. A portion of bounding sphere 712 is also included in cell 743, making cell 743 a phantom cell of bounding sphere 712. Additionally, the centroid of bounding sphere 713 is located in cell 744, making cell 744 the home cell of bounding sphere 713, with cell 743 being a phantom cell of bounding sphere 713. The centroid of bounding sphere 714 is located within cell 753, making cell 753 the home cell of bounding sphere 714. Because a portion of bounding sphere 714 is also included within cell 744, cell 744 is a phantom cell of bounding sphere 714.

A potential collision may occur between two objects when the two objects share a common home cell. This first scenario is called a home cell to home cell (or "HH") collision. A potential collision may also occur between a first object and a second object when the home cell of the first object is also a phantom cell of the second object. This second scenario is called a home cell to phantom cell (or "HP") collision. Because each cell is larger than the largest bounding sphere 430, in a graphics scene divided into different two-by-two-by-two arrays of 3D cells, two objects with different home cells but identical home cell types relative to the respective two-by-two-by-two arrays of 3D cells of the two objects, cannot possibly collide. For example, bounding spheres 714 and 711, which are from two different home cells (753 and 743, respectively) of the same type (3) in two different two-by-two-by-two arrays, cannot possibly collide.

Two objects may be positioned so that the two related bounding spheres collide in a phantom cell common to the two bounding spheres. This scenario is called a phantom cell to phantom cell (of "PP") collision. However, the combined distance margin between the object radius sphere and the bounding sphere guarantees either an HP or HH collision in this scenario, should an actual collision between objects occur. As a result, PP collisions do not need to be considered in the framework described herein because a collision between the two objects will be detected in either an HP or HH context, independent of the PP collision.

Figure 8A:
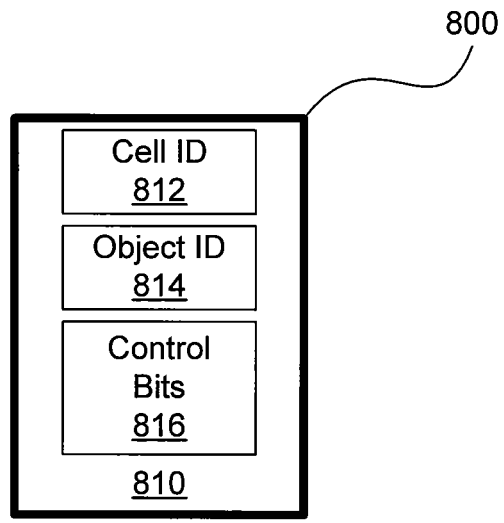
FIGS. 8A and 8B illustrate the structure of a cell identifier (ID) array entry, according to one embodiment of the present invention.
Figure 8B:
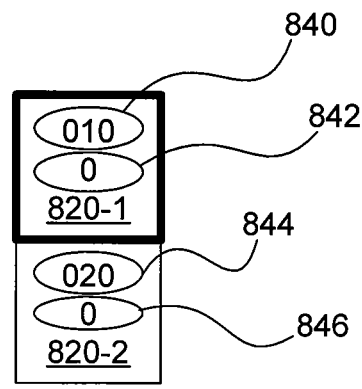

FIGS. 8A and 8B illustrate the structure of a cell identifier (ID) array entry 800, according to one embodiment of the present invention. The cell ID array entry 800 includes a cell ID 812, an object ID 814, and control bits 816.

The object ID 814 is a generic reference to an object. For example, if objects are numbered as sequential integers, then a first object ID 814 may be "0," and subsequent object IDs may be "1, 2, 3," and so forth. The cell ID 812 is a coordinate-based identifier, such as a hash, which associates the object referenced by the object ID 814 with a specific cell from an array of 3D cells. The cell ID 812 may be computed using a hash function, such as equation 1, below:

$$\text{Cell\_ID}=((\text{int})(\text{pos}.x/\text{CELLSIZE})\text{<<}\text{XSHIFT})|((\text{int})(\text{pos}.y/\text{CELLSIZE})\text{<<}\text{YSHIFT})|((\text{int})(\text{pos}.z/\text{CELLSIZE})\text{<<}\text{ZSHIFT});$$ (Equation 1)

Here, variable "pos" represents the position of an object. The value of each coordinate is given by an element of the pos variable. For example, pos.x represents the coordinate value in the x-direction. CELLSIZE is the dimension of the cells. The values of XSHIFT, YSHIFT, and ZSHIFT determine how many bits are assigned to the hash of each coordinate dimension. The hash is stored in the cell ID array entry as cell ID 812.

The control bits 8516 include, without limitation, bits used to identify the cell type of the home cell and bits to identify the types of cells intersected by the object's bounding volume. The control bits 816 also include a bit or flag mechanism indicating wither the given entry is associated with a home cell.

FIG. 8B illustrates a simplified representation of cell ID array entries. Entry 820-1 represents a home cell or "H cell," indicated here by a thicker bounding rectangle. The H cell includes a cell ID 840 and an object ID 842. In this example, the Object ID of entry 820-1 is "0." The cell ID is "010," which is hashed from the centroid coordinates of the associated object. Entry 820-2 represents a phantom cell, or "P cell," indicated here by the thinner bounding rectangle. The P cell includes a cell ID 844, and an object ID 846. The cell IDs 840, 844 and object IDs 842, 846 are computed as described above.

In one embodiment, each object initially includes an allocation for an array of eight entries 820, including one entry for a home cell, and seven entries for phantom cells. Each of the seven phantom cell entries covered by an associated bounding sphere includes a valid cell ID 812. Each of the seven phantom cell entries not covered by the bounding sphere is marked invalid, for example with a cell ID of 0xFFFFFFFF.

Figure 9A:
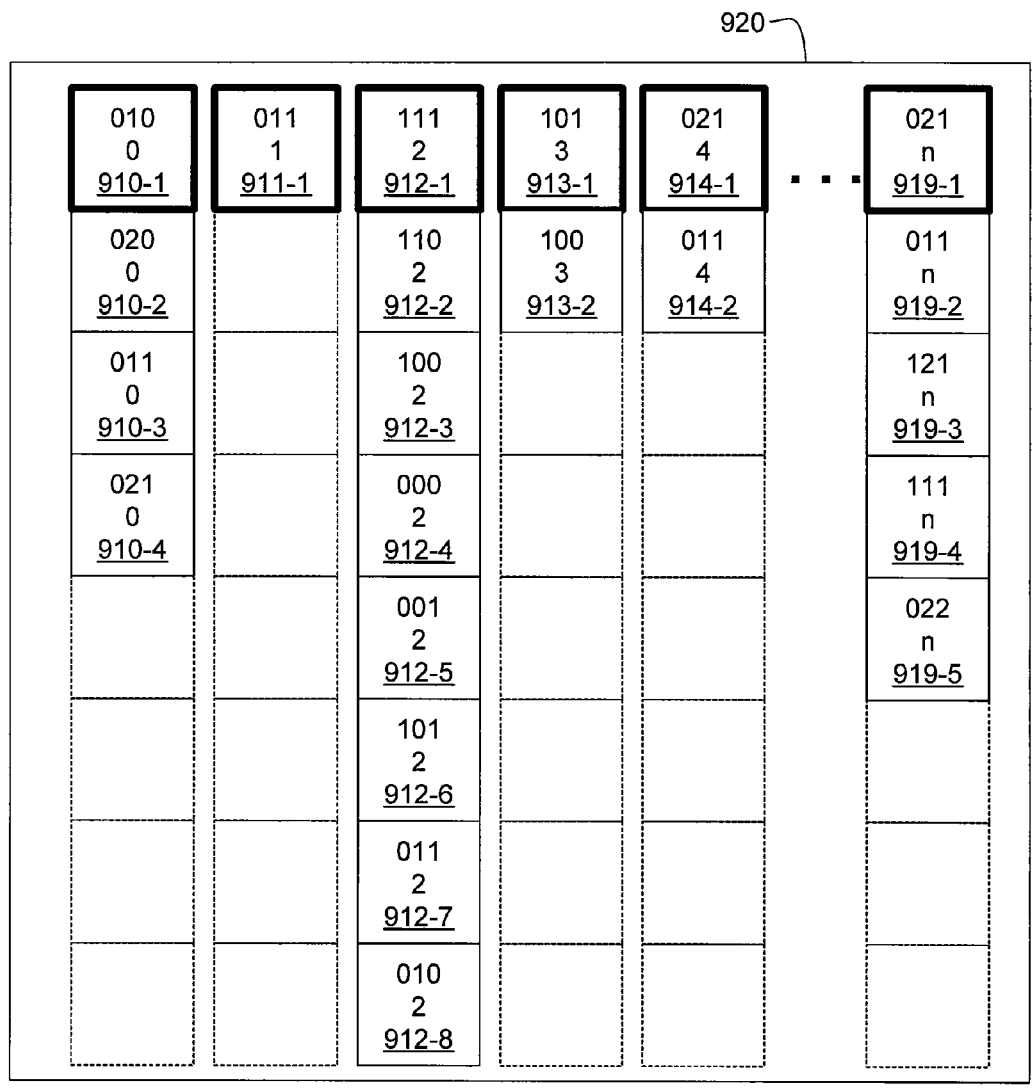
FIG. 9A illustrates an unsorted cell ID array, according to one embodiment of the present invention.

FIG. 9A illustrates an unsorted cell ID array 920, according to one embodiment of the present invention. The unsorted cell ID array 920 includes cell ID array entries 910, 911, 912, 913, and 914 through 919. As shown, the unsorted cell ID array 920 is organized according to object IDs.

To generate the unsorted cell ID array 920, a bounding sphere is computed for each object subject to collision analysis. Each bounding sphere is situated in a cell grid of uniformly sized cubes. A set of cell ID entries is generated based on a hash of the centroid coordinates, which identifies a home cell, and potentially up to seven phantom cells. The size of the cell is selected such that the dimension of each uniformly sized cube is at least 1.5 times larger than the radius of the largest bounding sphere. This approach process produces an H cell entry for each object, and may produce P cell entries.

In this scenario, object 0 includes H cell entry 910-1, and P cell entries 910-2, 910-3, and 610-4. Object 1 includes only H cell entry 911-1. Object 2 includes H cell entry 912-1 and seven P cell entries 912-2 through 912-8, and so forth.

Figure 9B:
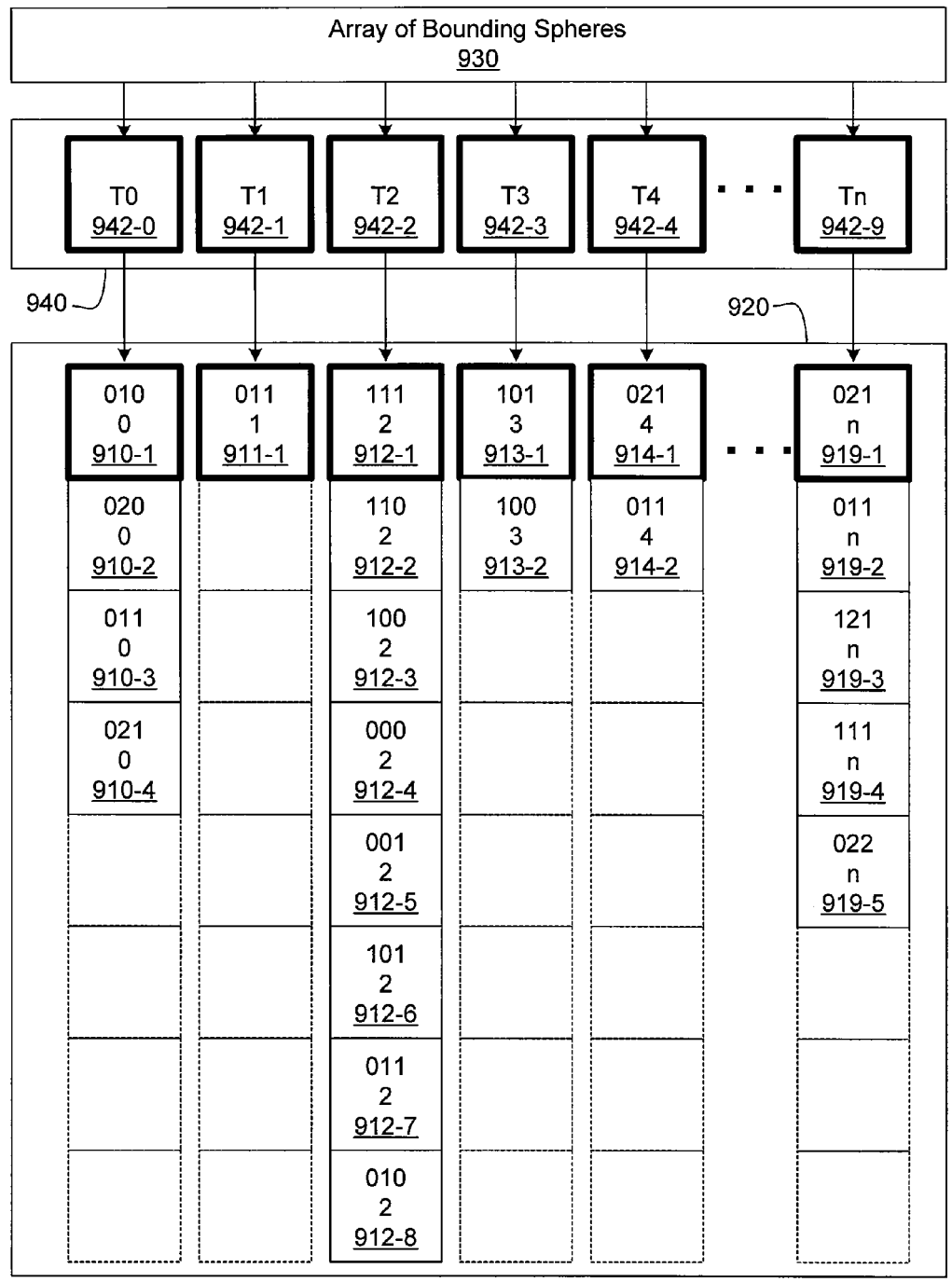
FIG. 9B illustrates a process for generating the unsorted cell ID array, according to one embodiment of the present invention.

FIG. 9B illustrates a process for generating the unsorted cell ID array 920, according to one embodiment of the present invention. In this embodiment, an array of bounding spheres 930 is assigned to an array of threads or thread block 940 for processing. For a given object within the array of bounding spheres 930, an H cell entry and P cell entries are created within the unsorted cell ID array 920 by one thread. That is, each object within the array of bounding spheres 930 is assigned to a different thread 942 for processing. To accommodate the case where there are more objects than threads, each thread is configured to process multiple objects. More specifically, thread "j" of thread block "i" handles objects iB+j, iB+j+nT, iB+j+2nT, and so on, where "B" is the number of threads per block and "T" is the total number of threads.

Figure 10:
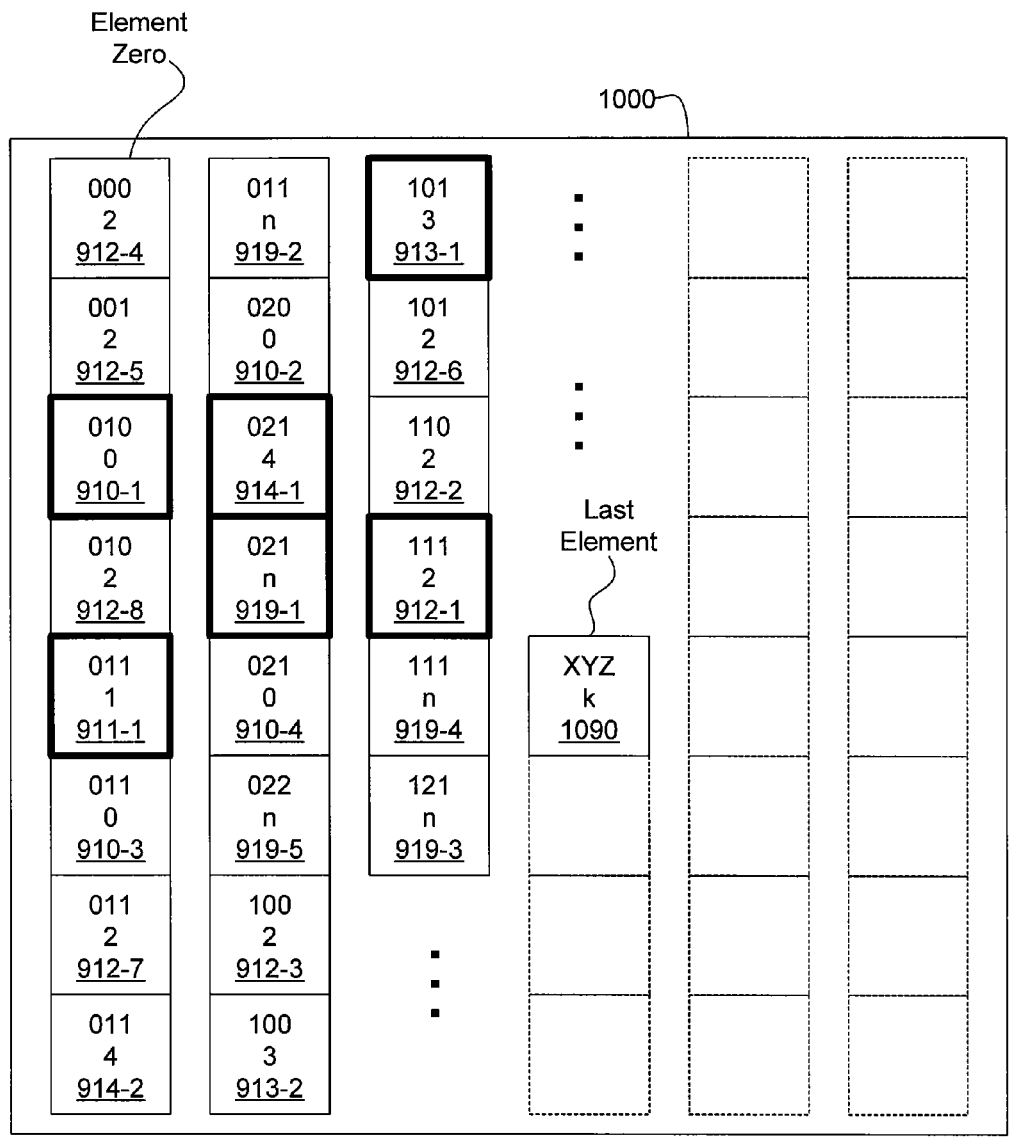
FIG. 10 illustrates a sorted cell ID array, according to one embodiment of the present invention.

FIG. 10 illustrates a sorted cell ID array 1000, according to one embodiment of the present invention. The sorted cell ID array 1000 represents a sorted version of the unsorted cell ID array 920 of FIG. 9A, and includes entries 910 through 919. The entries are sorted according to cell ID and by home or phantom status. For each group of entries with identical cell IDs, the H cells should appear in the beginning of the sorted list and the P cells should appear second. In this example, cell ID "000," associated with entry 912-4, is the first entry in the sorted cell ID array 1000, and cell ID "XYZ," associated with entry 1090, is the last entry in the sorted cell ID array 1000.

In one embodiment, the sorted cell ID array 1000 is generated using two sorting passes over the unsorted cell ID array 920 with a stable sorting algorithm. The radix sort algorithm is one example of a stable sorting algorithm. In a first pass, the unsorted cell ID array 920 is sorted to position all H cells first and all P cells last in an intermediate list. Sorting by H cells and P cells is analogous to sorting by least significant symbol first in a radix sort. In a second pass, the intermediate list is sorted according to cell ID to generate the sorted cell ID array 1000. Sorting by cell ID is analogous to sorting by the most significant symbol in a radix sort. Persons skilled in the art will recognize that various techniques may be used to accomplish the goal of sorting the unsorted cell ID array 920 according to cell ID, while positioning H cells first within a given group of identical cell IDs.

As shown, entries 912-4 and 912-5 are P cells of object 2. Because no H cell is situated in cell ID 000, there is no possibility of a collision in cell ID 912-4. Entry 910-1 represents the first H cell in the sorted cell ID array 1000. The cell ID of entry 910-1 is 010. The cell ID of entry 912-8 is also 010, indicating a potential collision may exist within cell ID 010. When a specific cell includes a portion of at least two different objects, those objects may be colliding, as determined by a more detailed narrow phase collision analysis. A cell that requires a narrow phase collision analysis is referred to as a "collision cell." In this example cell ID 010 is a collision cell because objects 0 and 2 both occupy some volume within the cell and may represent a collision. Again, with a cell size established to be 1.5 times larger than the largest bounding volume, only HP and HH collisions need be considered for detailed collision analysis.

Figure 11A:
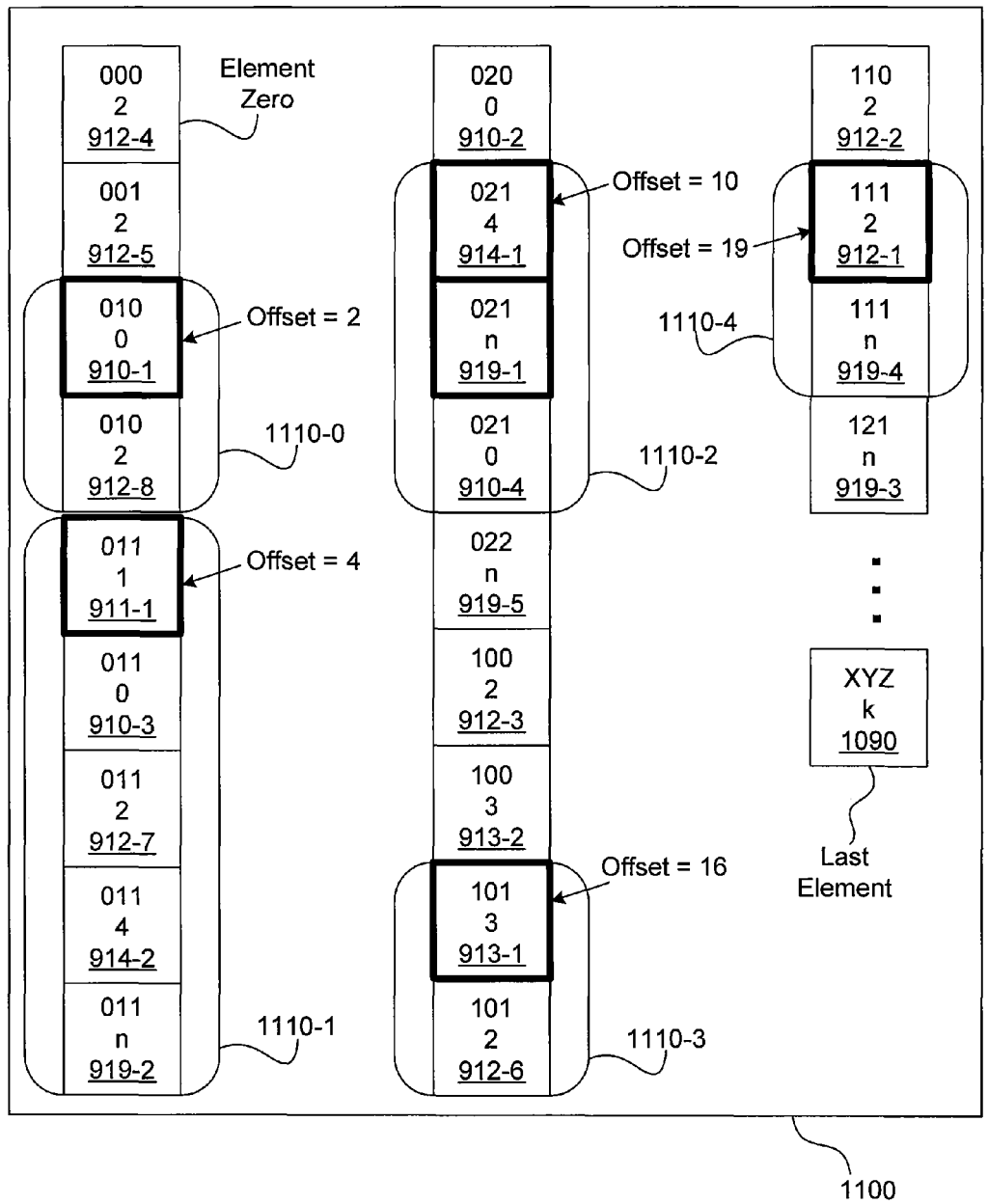
FIG. 11A illustrates a sorted cell ID array with collision cells identified, according to one embodiment of the present invention.

FIG. 11A illustrates a sorted cell ID array 1100 with collision cells identified, according to one embodiment of the present invention. A collision cell may be identified by a transition in cell ID number in the sorted list, where the group of entries with a new cell ID includes at least one H cell. A list of indices to the transitions in the sorted cell ID array 1100 may be computed using a prefix sum over the sorted cell ID array 1100, where the sum operation adds up the number of sequential entries with the same cell ID.

In one embodiment, the entries within the sorted cell ID array 1000 are assigned approximately evenly over a set of thread processors, such as parallel processing units (PPUs) 202 of FIG. 2. Each thread within a thread processor scans the assigned portion of the sorted cell ID array 1000 for a first transition and then begins processing data within the assigned portion. The thread assigned to the beginning portion of the sorted cell ID array 1000 begins processing without skipping a first transition. In this way, the sorted cell ID array 1000 may be analyzed in parallel, without the possibility of missing a portion of data, and furthermore, without overlapping results.

As shown, the first collision cell is at an offset of 2 within the sorted cell ID array 1100. Cell ID 010 corresponds to a unique cell, which has an associated collision cell group 1110-0. The collision cell group 1110-0 includes cell ID array entries 910-1 and 912-8 for objects 0 and 2, which both occupy some volume within the cell. Therefore, narrow phase collision detection should be performed between H cell 910-1 and P cell 912-8. Collision cell group 1110-1 is at offset 4 and includes H cell 911-1 and P cells 910-3, 912-7, 914-2 and 919-2. Narrow phase collision detection should therefore be performed between H cell 911-1 and each P cell 910-3, 912-7, 914-2, and 919-2. Collision cell group 1110-2 is at offset 10 and includes H cells 914-1 and 919-1 as well as P cell 910-4. Narrow phase collision detection should therefore be performed between H cells 914-1 and 919-1 as well as between H cell 914-1 and P cell 910-4 and H cell 919-1 and P cell 910-4. Collision cell group 1110-3 is at offset 16 and includes H cell 913-1 and P cell 912-6. Narrow phase collision detection should therefore be performed between H cell 913-1 and P cell 912-6. Collision cell group 1110-4 is at offset 19 and includes H cell 912-1 and P cell 919-4. Narrow phase collision detection should therefore be performed between H cell 912-1 and P cell 919-4.

Figure 11B:
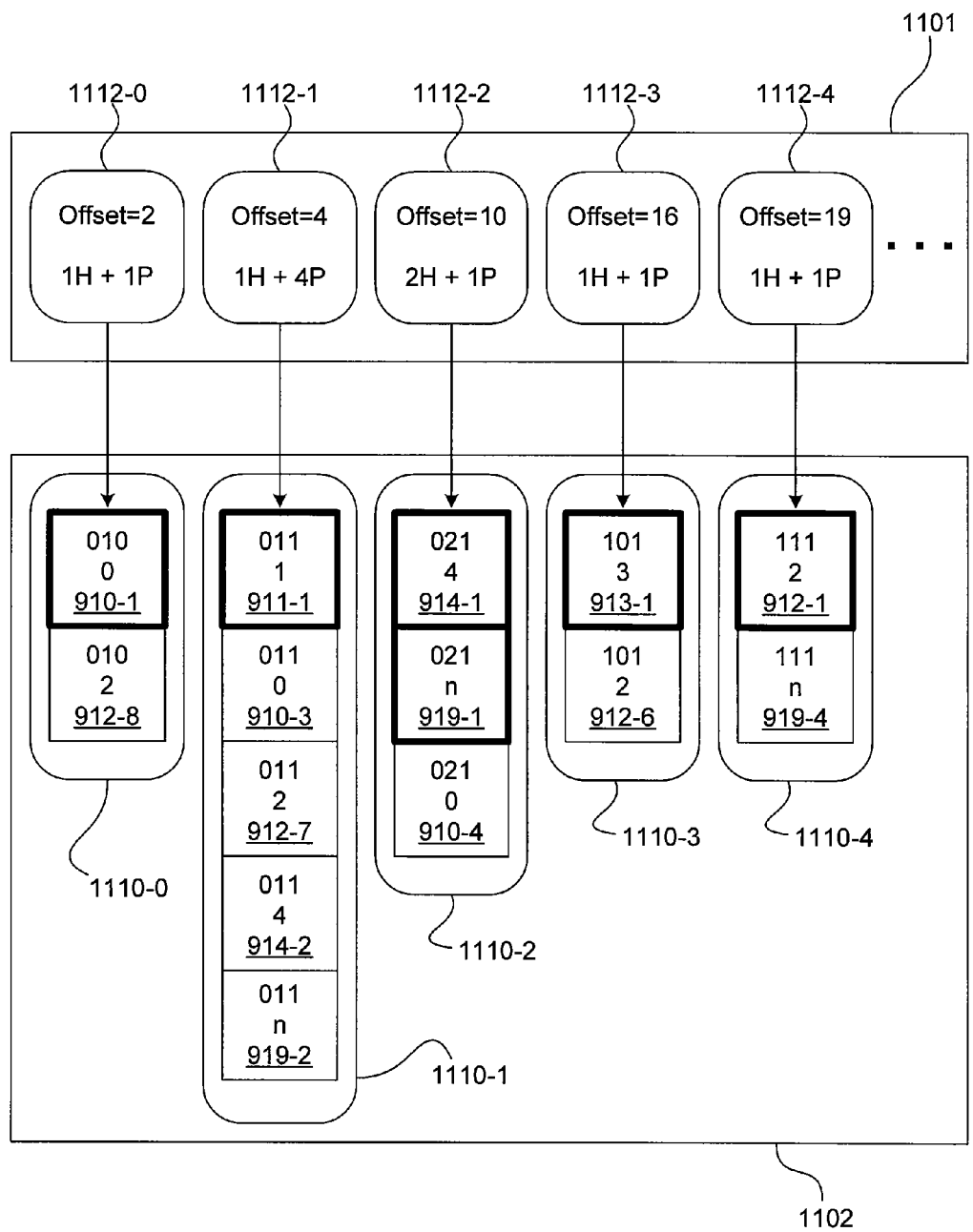
FIG. 11B illustrates a collision cell list, according to one embodiment of the present invention.

FIG. 11B illustrates a collision cell list 1101, according to one embodiment of the present invention. A set of collision cell descriptors 1112, within the collision cell list 1101, reference collision cell groups 1110 within a list of collision cell groups 1102. The list of collision cell groups 1102 enumerates the complete set of cells that should be subjected to narrow phase collision detection. The collision cell list 1101 is generated by scanning the sorted cell ID array 1100 and establishing which entries constitute the beginning of a collision cell group 1110.

In one embodiment, set forth below in FIG. 13, the collision groups 1110 are processed in multiple passes to eliminate the possibility of overlapping processing in narrow phase collision detection. In a 3D system, for example, the collision cell groups 1110 may be processed in parallel in eight passes, according to cell type. More specifically, in a first pass, all collision cell groups 1110 of type 1 are processed in parallel over a set of thread processors. In a second pass, all collision groups 1110 of type 2 are processed in parallel over a set of thread processors, and so forth. By performing the narrow phase collision detection with respect to H cells, each collision is counted only once, and overall accounting for collision interaction within the system being analyzed may be measured without double counting collisions. Importantly, the spatial separation between a first cell and a second cell of the same type within different arrays of 3D cells guarantees that objects within the first cell will not collide with objects in the second cell, and therefore narrow phase collision detection may proceed in parallel over all cells of the same type.

In an alternative embodiment, set forth below in FIG. 15, a portion of the method 1300 can be applied in a special scenario, where a group of thread processors performs narrow-phase collision detection analysis on multiple two-by-two-by-two arrays of cells in two passes. In such an approach, each thread processor is assigned to a different two-by-two-by-two array. In a first pass, each thread processor operates on the four "top-most" cells in its corresponding two-by-two-by-two array. Steps 1320-1332 of method 1300 are followed by each thread processor, where the cell types include only cell types 1-4, to perform narrow-phase collision detection. Instead of synchronizing across the thread processors after processing a particular cell type, as set forth in step 1334 of method 1300, the synchronization operation is across the different threads executing within each thread processor. After the thread processors finish processing cell types 1-4, a synchronization operation is performed across all of the thread processors. In a second pass, each thread processor operates on the four "bottom-most" cells in its corresponding two-by-two-by-two array. Again, steps 1320-1332 of method 1300 are followed by each thread processor, where the cell types include only cell types 5-8, and, after processing a particular cell type a synchronization operation is performed across the different threads executing within each thread processor.

Figure 12:
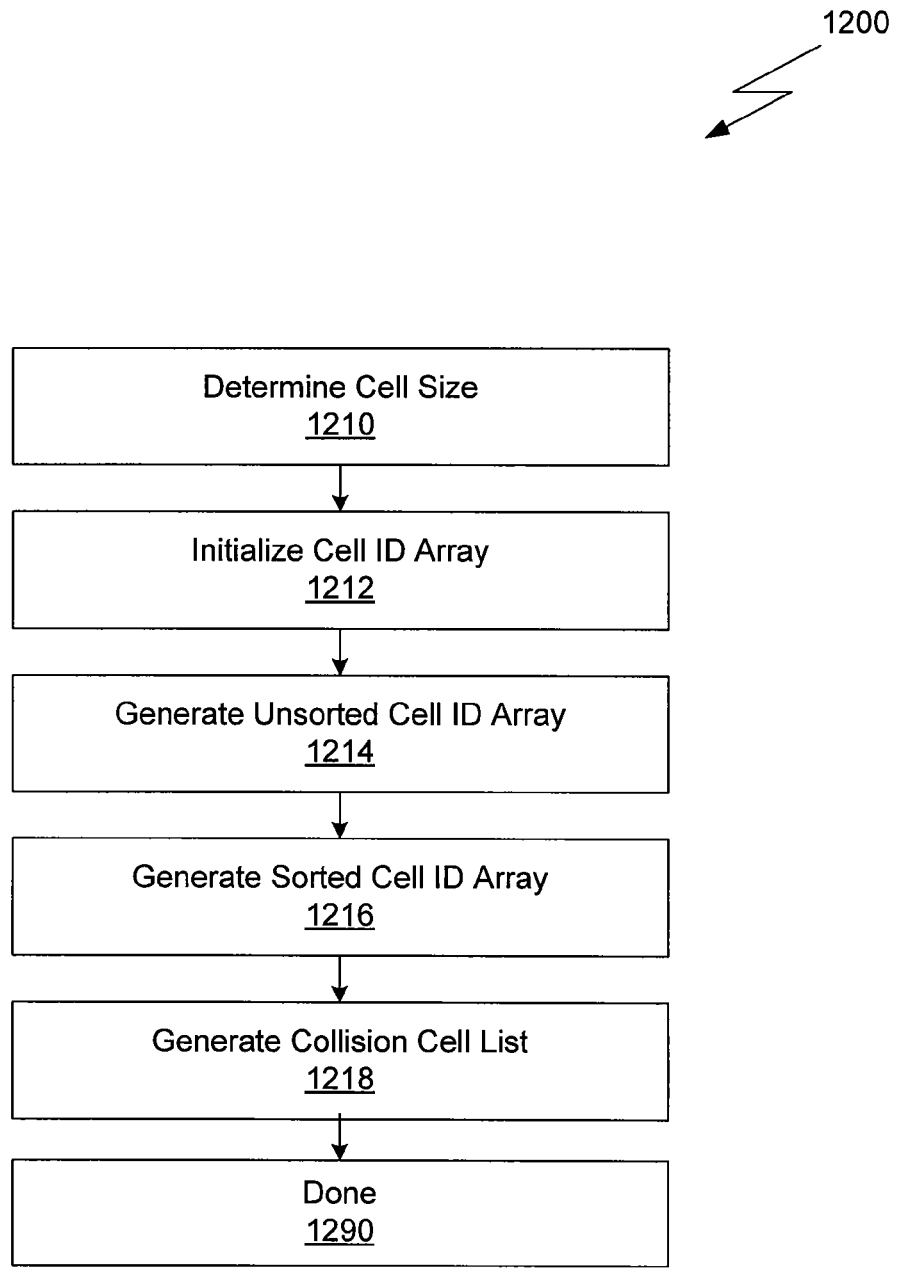
FIG. 12 is a flow diagram of method steps for performing broad-phase collision detection analysis, according to a first embodiment of the present invention.

FIG. 12 is a flow diagram of method steps for performing broad-phase collision detection, according to a first embodiment of the present invention. Although the method steps are described in conjunction with the systems of FIGS. 1, 2, and 3, persons skilled in the art will understand that any system that performs the method steps, in any order, is within the scope of the invention.

The method begins in step 1210, where a cell size is determined for uniformly partitioning the 3D coordinate system into one or more arrays of cubical cells. The cell size is defined as the length of each edge of a uniform cube within the array. The cell size should be at least 1.5 times the diameter of the largest bounding sphere to be processed. The radius of each bounding sphere is the square root of two times the radius of each object to be processed.

In step 1212, a cell ID array is initialized to allocate space that includes entries for each bounding sphere associated with each object to be processed. For a 3D grid of cells, eight entries are allocated for each bounding sphere, where one entry is allocated for a home cell and seven entries are allocated for phantom cells.

In step 1214, an unsorted cell ID array is generated in the cell ID array (allocated in step 1212) by mapping each bounding sphere onto a set of one or more cells as cell ID array entries. The cell ID array entries from a given sphere are stored in the one through eight entries allocated for each bounding sphere.

In step 1216, a sorted cell ID array is generated by sorting the data stored in the unsorted cell ID array. The data is sorted according to cell ID number, with entries for home cells located at the beginning of each group of entries with identical cell ID numbers, and entries for phantom cells located at the end of the group.

In step 1218, a collision cell list is generated from the sorted cell ID array. The sorted cell ID array is scanned for cell ID transitions, and a collision cell list is generated that organizes the entries within the sorted cell ID array into groups of entries that need to be processed using narrow phase collision detection. In step 1230, the collision cell list is traversed by one or more threads executing in parallel to perform narrow phase collision detection on each collision cell. Any technically feasible technique may be used to perform the narrow phase collision detection within this step. The method terminates in step 1290.

Figure 13:
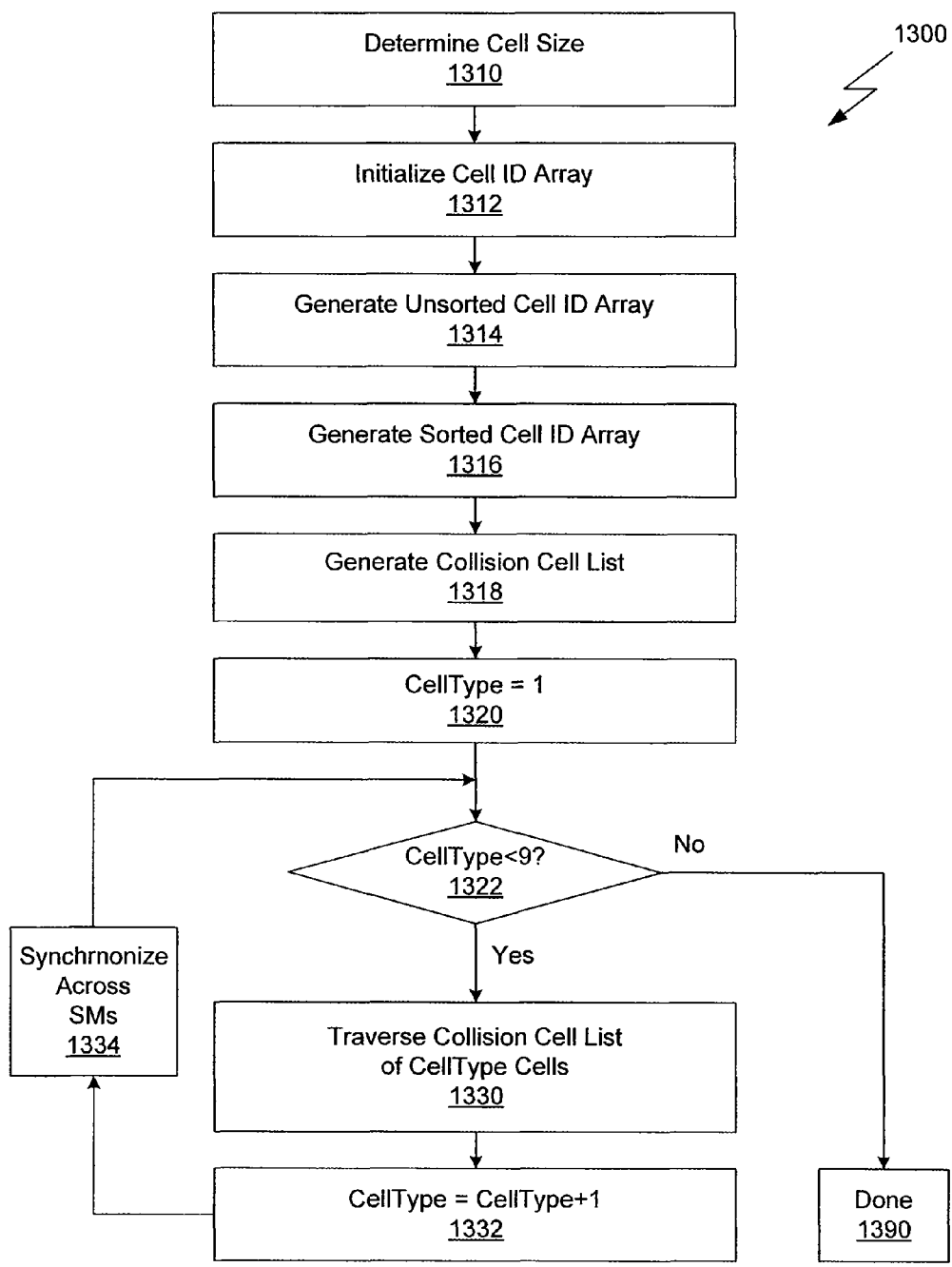
FIG. 13 is a flow diagram of method steps for performing collision detection analysis in multiple passes, according to one embodiment of the invention.

FIG. 13 is a flow diagram of method steps for performing collision detection analysis in multiple passes, according to a second embodiment of the invention. Although the method steps are described in conjunction with the systems of FIGS. 1, 2, and 3, persons skilled in the art will understand that any system that performs the method steps, in any order, is within the scope of the invention.

The method begins in step 1310, where a cell size is determined for uniformly partitioning the 3D coordinate system into one or more arrays of cubical cells. The cell size is defined as the length of each edge of a uniform cube within the array. The cell size should be at least 1.5 times the diameter of the largest bounding sphere to be processed. The radius of each bounding sphere is the square root of two times the radius of each object to be processed.

In step 1312, a cell ID array is initialized to allocate space that includes entries for each bounding sphere associated with each object to be processed. For a 3D grid of cells, eight entries are allocated for each bounding sphere, where one entry is allocated for a home cell and seven entries are allocated for phantom cells.

In step 1314, an unsorted cell ID array is generated in the cell ID array (allocated in step 1312) by mapping each bounding sphere onto a set of one or more cells as cell ID array entries. The cell ID array entries from a given sphere are stored in the one through eight entries allocated for each bounding sphere.

In step 1316, a sorted cell ID array is generated by sorting the data stored in the unsorted cell ID array. The data is sorted according to cell ID number, with entries for home cells located at the beginning of each group of entries with identical cell ID numbers, and entries for phantom cells located at the end of the group.

In step 1318, a collision cell list is generated from the sorted cell ID array. The sorted cell ID array is scanned for cell ID transitions, and a collision cell list is generated that organizes the entries within the sorted cell ID array into groups of entries that need to be processed using narrow phase collision detection.

In step 1320, variable CellType is set to 1. If, in step 1322, CellType is less than 9, then the method proceeds to step 1330, where the collision cell list is traversed by one or more threads executing in parallel to perform narrow phase collision detection on each collision cell of the type specified by variable CellType. Any technically feasible technique may be used to perform the narrow phase collision detection within this step. In step 1332, variable CellType is incremented by one, and the method subsequently proceeds to step 1334, where a synchronization operation is performed across all thread processors. The method then returns back to step 1322.

If, in step 1322, CellType is not less than 9, then the method terminates in step 1390.

Figure 14A:
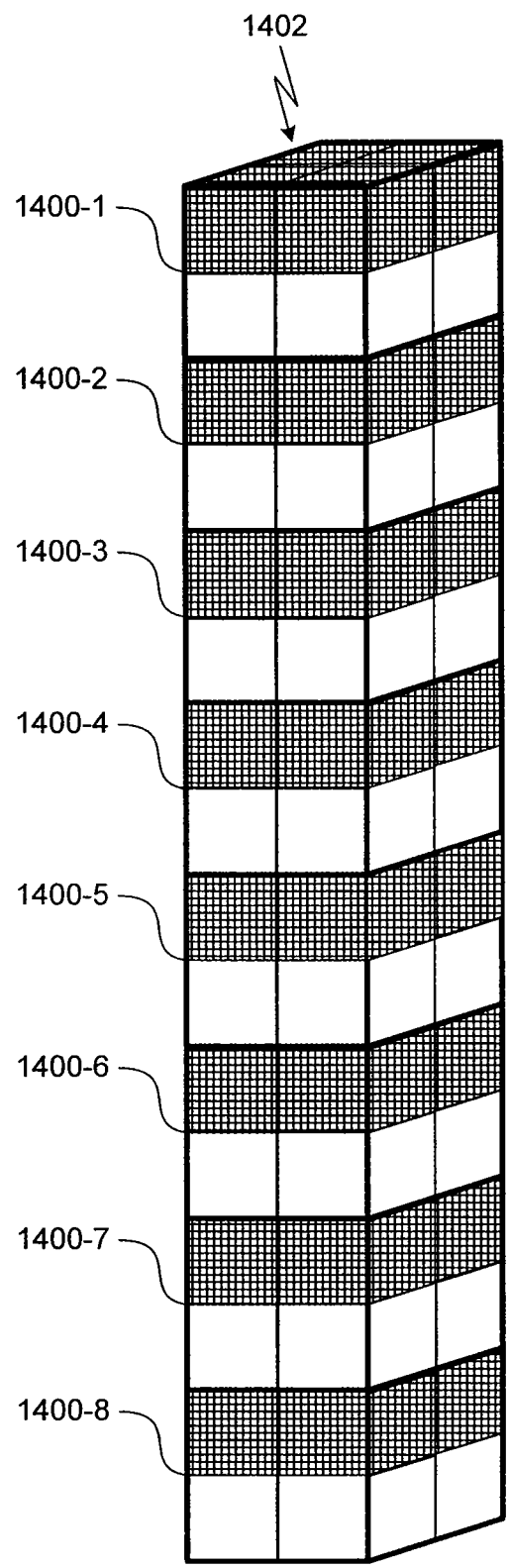
FIGS. 14A and 14B are conceptual diagrams of eight two-by-two-by-two arrays of cells being processed in two passes by a group of thread processors, according to one embodiment of the invention.
Figure 14B:
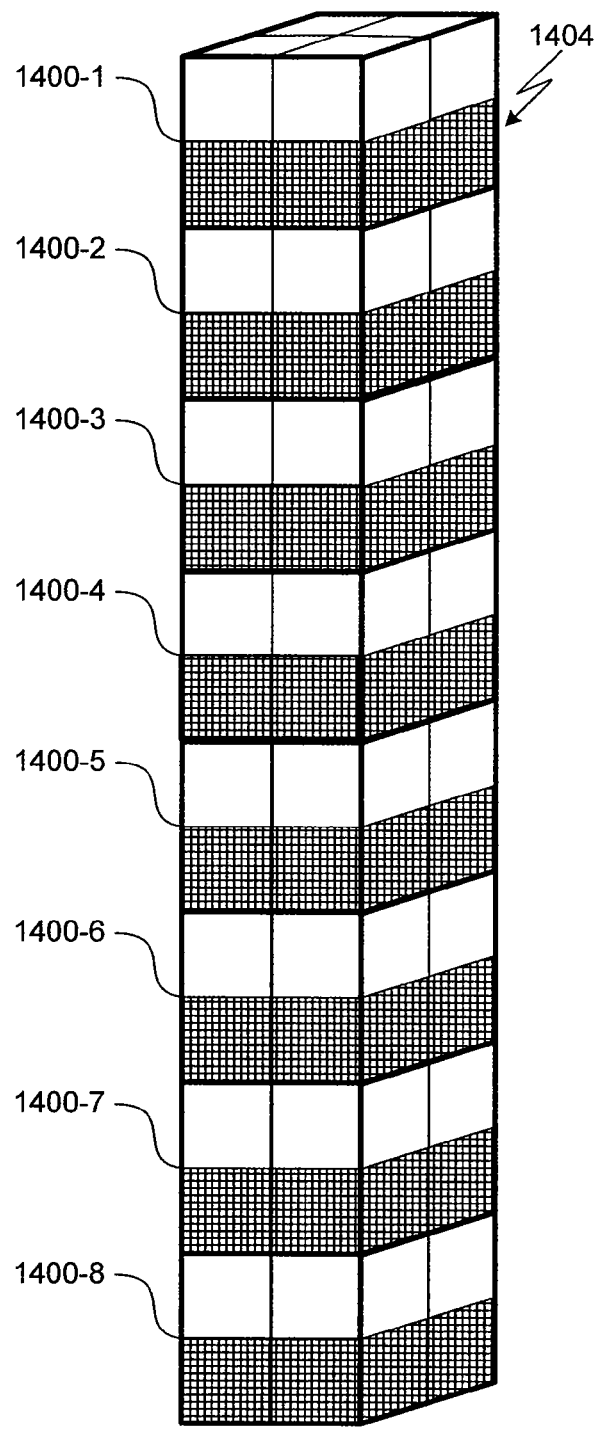

FIGS. 14A and 14B are conceptual diagrams of eight two-by-two-by-two arrays of cells being processed in two passes by a group of thread processors, according to one embodiment of the invention. As shown, eight two-by-two-by-two arrays of cells 1400-1 through 1400-8 are each processed by a different thread processor. In a first pass, depicted in FIG. 14A, "top-most" cells 1402 of each two-by-two-by-two array are processed by a different thread processor, where narrow-phase collision detection analysis is performed on collision cells of four cell types (e.g., cell types 1-4). After the first past has been completed, a synchronization operation is performed across the different thread processors. In a second pass, depicted in FIG. 14B, "bottom-most" cells 1404 of each two-by-two-by-two array are processed by the same thread processor that processed the top-most cells. In this second pass, narrow-phase collision detection analysis is performed on collision cells of the other four cell types (e.g., cell types 5-8).

Figure 15:
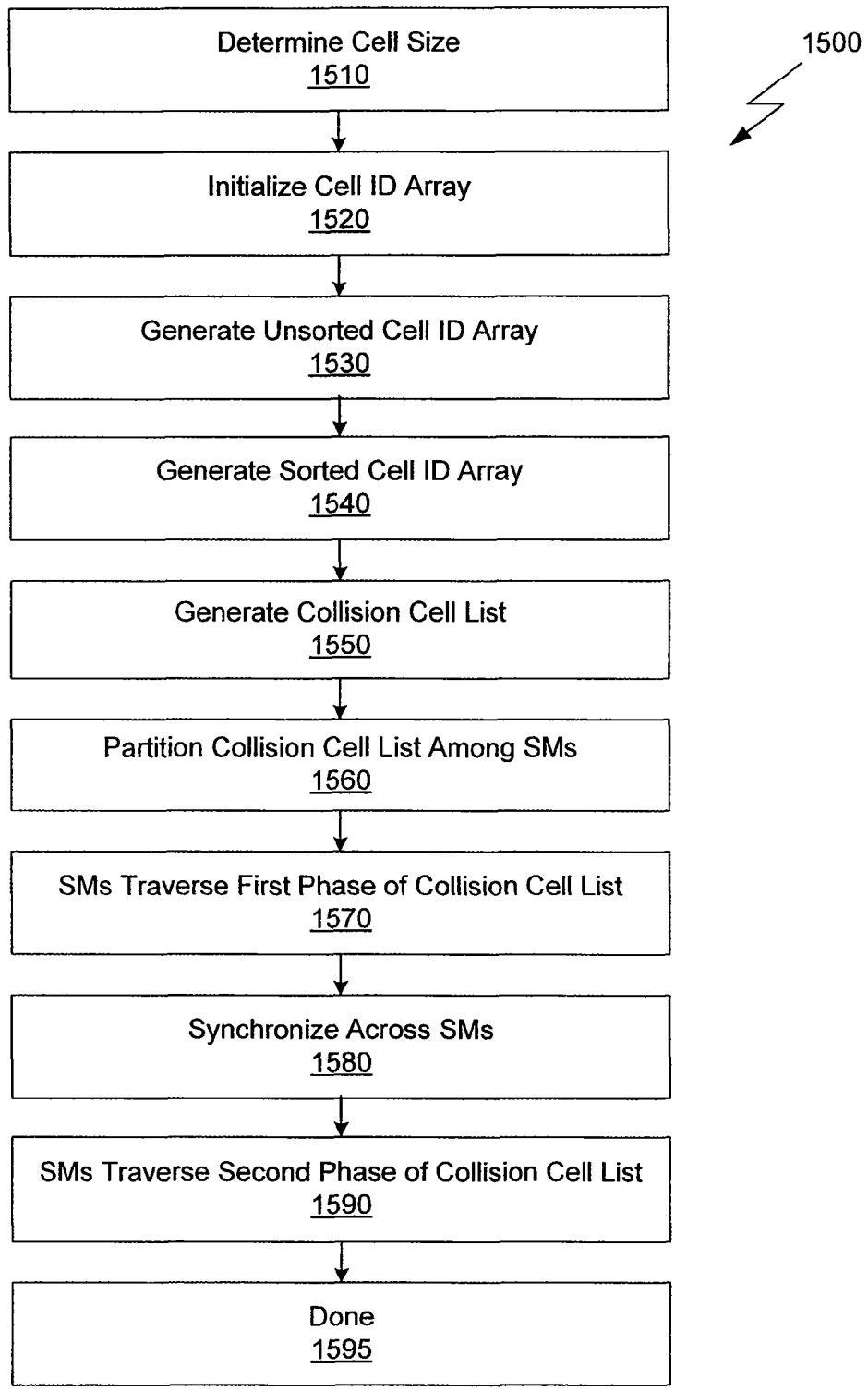
FIG. 15 is a flow diagram of method steps for performing collision detection analysis in two passes, according to another embodiment of the invention.

FIG. 15 is a flow diagram of method steps for performing collision detection analysis on multiple arrays of 3D cells, in two passes, according to another embodiment of the invention. Although the method steps are described in conjunction with the systems of FIGS. 1, 2, and 3, persons skilled in the art will understand that any system that performs the method steps, in any order, is within the scope of the invention.

Steps 1510, 1520, 1530, 1540 and 1550 are similar to steps 1310, 1312, 1314, 1316 and 1318, respectively, of method 1300 and therefore are not discussed again in detail here. The result of steps 1510-1550 is a collision cell list that identifies the cell type of each collision cells as well as the particular two-by-two-by-two array of 3D cells in which each collision cell resides.

In step 1560, the collision cell list is partitioned among the thread processors, where each thread processor is assigned a different two-by-two-by-two array. A given thread processor, therefore, processes only the collision cells in its corresponding two-by-two-by-two array of cells.

In step 1570, each thread processors traverse the different collision cells within its respective two-by-two-by-two array in a first pass, performing narrow-phase collision detection analysis on collision cells of certain cell types. As described above, each thread processor follows steps 1320-1332 of method 1300, where the cell types include only cell types 1-4, to perform narrow-phase collision detection analysis. Again, instead of synchronizing across the thread processors after processing one of the cell types, as done in step 1334 of method 1300, the synchronization operation is across the different threads executing within each thread processor.

After the thread processors finish processing cell types 1-4, in step 1580, a synchronization operation is performed across all of the thread processors.

In step 1590, in a second pass, each thread processor operates on the collision cells within its respective two-by-two-by-two array of the remaining cell types. Again, steps 1320-1332 of method 1300 are followed by each thread processor, to perform narrow-phase collision detection analysis on collisions cells of cell types 5-8. As in the first pass, after processing a particular cell type a synchronization operation is performed across the different threads executing within each thread processor.

In sum, a method for efficiently performing broad phase collision detection is disclosed that uses parallel spatial subdivision. Each object to be processed is enclosed in a bounding sphere, which is mapped onto at least one cell, but as many as eight cells. The cell that encloses the centroid of the bounding sphere is called a home cell, and any other surrounding cells intersected by the bounding sphere are called phantom cells. Home cells and phantom cells associated with each bounding sphere are populated into an unsorted cell ID array. The unsorted cell ID array is then sorted according to a hash of coordinates for each cell, with home cells positioned first and phantom cells positioned second for each group of cells with an identical cell ID. Once the cell the IDs are sorted, transitions in the cell ID values are indexed. Each cell ID transition marks a potential collision cell. Each collision cell needs to be processed according to narrow phase collision detection. In one embodiment, the narrow phase collision detection is performed over eight passes, wherein each pass is performed over one alignment (or type) of cell. The spatial separation of cells of an identical type guarantees that narrow phase collision detection does not overlap processing between the cells, allowing the process of narrow phase collision detection to be executed to an arbitrarily high degree of parallelism.

While the forgoing is directed to embodiments of the present invention, other and further embodiments of the invention may be devised without departing from the basic scope thereof. For example, aspects of the present invention may be implemented in hardware or software or in a combination of hardware and software. One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored. Such computer-readable storage media, when carrying computer-readable instructions that direct the functions of the present invention, are embodiments of the present invention. Therefore, the scope of the present invention is determined by the claims that follow.

I claim:

1. A method for performing a collision detection analysis for a plurality of graphics objects, the method comprising:
   initializing a cell identifier (ID) array that includes memory space for entries corresponding to a first bounding sphere associated with a first graphics object and entries corresponding to a second bounding sphere associated with a second graphics object;
   generating an unsorted cell ID array that includes one or more entries corresponding to the first bounding sphere and one or more entries corresponding to the second bounding sphere, wherein each entry in the unsorted cell ID array includes a cell ID number and an object ID;
   generating a sorted cell ID array based on the cell ID number associated with each entry in the unsorted cell ID array;
   generating a collision cell list based on the sorted cell ID array;
   setting a cell type to a first cell type; and
   traversing the collision cell list with a plurality of threads to perform a narrow phase collision detection analysis on each collision cell included in the collision cell list having only the first cell type.

2. The method of claim 1, further comprising the steps of incrementing the cell type to a second cell type and determining whether the second cell type is less than a threshold value.

3. The method of claim 2, further comprising the step of traversing the collision list with plurality of threads to perform a narrow phase collision detection analysis on each collision cell including in the collision cell list having the second cell type, if the second cell type is less than the threshold value.

4. The method of claim 1, wherein at least two of the plurality of threads execute in parallel within a thread processor included in a parallel processing unit.

5. The method of claim 4, wherein the parallel processing units comprises a graphics processing unit.

6. The method of claim 1, further comprising the step of generating a three-dimensional (3D) array of cells, wherein a centroid of each of the first bounding sphere and the second bounding sphere is located within one of the cells of the 3D array.

7. The method of claim 6, wherein each cell in the 3D array of cells is a cube having a width that is one and a half times larger than a largest bounding sphere in a plurality of bounding spheres that includes both the first bounding sphere and the second bounding sphere.

8. The method of claim 7, wherein a first object radius sphere fully encompasses the first graphics object, and the radius of the first bounding sphere is equal to the radius of the first object radius sphere multiplied by the square root of two.

9. The method of claim 1, wherein a different one of the plurality of threads processes a different collision cell in the collision cell list having only the first cell type when performing the narrow phase collision detection analysis.

10. A method for performing a collision detection analysis for a plurality of graphics objects, the method comprising:
    initializing a cell identifier (ID) array that includes memory space for entries corresponding to a first bounding sphere associated with a first graphics object and entries corresponding to a second bounding sphere associated with a second graphics object;
    generating an unsorted cell ID array that includes one or more entries corresponding to the first bounding sphere and one or more entries corresponding to the second bounding sphere, wherein each entry in the unsorted cell ID array includes a cell ID number and an object ID;
    generating a sorted cell ID array based on the cell ID number associated with each entry in the unsorted cell ID array;
    generating a collision cell list based on the sorted cell ID array;
    setting a cell type to a first cell type;
    traversing the collision cell list with a plurality of threads to perform a narrow phase collision detection analysis on each collision cell included in the collision cell list having only the first cell type; and
    generating a three-dimensional (3D) array of cells, wherein a centroid of each of the first bounding sphere and the second bounding sphere is located within one of the cells of the 3D array, wherein the one or more entries included in the unsorted cell ID array that correspond to the first bounding sphere associated with the first graphics object include a first entry having a cell ID number corresponding to a cell in the 3D array of cells within which the centroid of the first bounding sphere is located, and the one or more entries included in the unsorted cell ID array that correspond to the second bounding sphere associated with the second graphics object include a first entry having a cell ID number corresponding to a cell in the 3D array of cells within which the centroid of the second bounding sphere is located.

11. The method of claim 10, wherein the cell ID number corresponding to the cell in the 3D array of cells within which the centroid of the first bounding sphere is located is the same as the cell ID number corresponding to the cell in the 3D array of cells within which the centroid of the second bounding sphere is located, thereby indicating that the centroids of each of the first bounding sphere and the second bounding sphere are located within a same cell in the 3D array of cells and that the same cell is a collision cell.

12. The method of claim 10, wherein the one or more entries included in the unsorted cell ID array that correspond to the first bounding sphere associated with the first graphics object include a second entry having a cell ID number corresponding to another cell in the 3D array of cells within which a portion of the first bounding sphere is located.

13. The method of claim 12, wherein the cell ID number corresponding to the cell in the 3D array of cells within which the centroid of the second bounding sphere is located is the same as the cell ID number corresponding to the another cell in the 3D array of cells within which the portion of the first bounding sphere is located, thereby indicating that the centroid of the second bounding sphere and the portion of the first bounding sphere are located within a same cell in the 3D array of cells and that the same cell is a collision cell.

14. A method for performing a collision detection analysis for a plurality of graphics objects, the method comprising:
    initializing a cell identifier (ID) array that includes memory space for entries corresponding to a first bounding sphere associated with a first graphics object and entries corresponding to a second bounding sphere associated with a second graphics object;
    generating an unsorted cell ID array that includes one or more entries corresponding to the first bounding sphere and one or more entries corresponding to the second bounding sphere, wherein each entry in the unsorted cell ID array includes a cell ID number and an object ID;
    generating a sorted cell ID array based on the cell ID number associated with each entry in the unsorted cell ID array;
    generating a collision cell list based on the sorted cell ID array;

setting a cell type to a first cell type;
traversing the collision cell list with a plurality of threads to perform a narrow phase collision detection analysis on each collision cell included in the collision cell list having only the first cell type; and
generating a three-dimensional (3D) array of cells, wherein a centroid of each of the first bounding sphere and the second bounding sphere is located within one of the cells of the 3D array, wherein the step of generating the unsorted cell ID array comprises:
determining one or more cells in the 3D array of cells that include the centroid of the first bounding sphere or any other portion of the first bounding sphere, and generating a different cell ID array entry corresponding to each of the one or more cells; and
determining one or more cells in the 3D array of cells that include the centroid of the second bounding sphere or any other portion of the second bounding sphere, and generating a different cell ID array entry corresponding to each of the one or more cells.

15. The method of claim 14, wherein a different thread is assigned to each of the first graphics object and the second graphics object for generating the unsorted cell ID array.

16. The method of claim 14, wherein the step of generating the sorted cell ID array comprises performing two sorting passes over the unsorted cell ID array.

17. The method of claim 16, wherein the first sorting pass comprises performing a radix sort operation that sorts the cell ID array entries according to whether the entries correspond to home cells or phantom cells in the 3D array of cells to generate an intermediate list.

18. The method of claim 17, wherein the second sorting pass comprises performing a radix sort operation that sorts the intermediate list according to the cell ID number associated with each of the cell ID array entries.

19. A non-transitory computer-readable medium including instructions that, when executed by a processing unit, cause the processing unit to perform a collision detection analysis for a plurality of graphics objects, by performing the steps of:
initializing a cell identifier (ID) array that includes memory space for entries corresponding to a first bounding sphere associated with a first graphics object and entries corresponding to a second bounding sphere associated with a second graphics object;
generating an unsorted cell ID array that includes one or more entries corresponding to the first bounding sphere and one or more entries corresponding to the second bounding sphere, wherein each entry in the unsorted cell ID array includes a cell ID number and an object ID;
generating a sorted cell ID array based on the cell ID number associated with each entry in the unsorted cell ID array;
generating a collision cell list based on the sorted cell ID array;
setting a cell type to a first cell type; and
traversing the collision cell list with a plurality of threads to perform a narrow phase collision detection analysis on each collision cell included in the collision cell list having only the first cell type.

20. The non-transitory computer-readable medium of claim 19, further comprising the step of generating a three-dimensional (3D) array of cells, wherein a centroid of each of the first bounding sphere and the second bounding sphere is located within one of the cells of the 3D array.

21. The non-transitory computer-readable medium of claim 19, wherein a different one of the plurality of threads processes a different collision cell in the collision cell list having only the first cell type when performing the narrow phase collision detection analysis.

22. A non-transitory computer-readable medium including instructions that, when executed by a processing unit, cause the processing unit to perform a collision detection analysis for a plurality of graphics objects, by performing the steps of:
initializing a cell identifier (ID) array that includes memory space for entries corresponding to a first bounding sphere associated with a first graphics object and entries corresponding to a second bounding sphere associated with a second graphics object;
generating an unsorted cell ID array that includes one or more entries corresponding to the first bounding sphere and one or more entries corresponding to the second bounding sphere, wherein each entry in the unsorted cell ID array includes a cell ID number and an object ID;
generating a sorted cell ID array based on the cell ID number associated with each entry in the unsorted cell ID array;
generating a collision cell list based on the sorted cell ID array;
setting a cell type to a first cell type;
traversing the collision cell list with a plurality of threads to perform a narrow phase collision detection analysis on each collision cell included in the collision cell list having only the first cell type; and
generating a three-dimensional (3D) array of cells, wherein a centroid of each of the first bounding sphere and the second bounding sphere is located within one of the cells of the 3D array, wherein the one or more entries included in the unsorted cell ID array that correspond to the first bounding sphere associated with the first graphics object include a first entry having a cell ID number corresponding to a cell in the 3D array of cells within which the centroid of the first bounding sphere is located, and the one or more entries included in the unsorted cell ID array that correspond to the second bounding sphere associated with the second graphics object include a first entry having a cell ID number corresponding to a cell in the 3D array of cells within which the centroid of the second bounding sphere is located.

23. The non-transitory computer-readable medium of claim 22, wherein the cell ID number corresponding to the cell in the 3D array of cells within which the centroid of the first bounding sphere is located is the same as the cell ID number corresponding to the cell in the 3D array of cells within which the centroid of the second bounding sphere is located, thereby indicating that the centroids of each of the first bounding sphere and the second bounding sphere are located within a same cell in the 3D array of cells and that the same cell is a collision cell.

24. The non-transitory computer-readable medium of claim 22, wherein the one or more entries included in the unsorted cell ID array that correspond to the first bounding sphere associated with the first graphics object include a second entry having a cell ID number corresponding to another cell in the 3D array of cells within which a portion of the first bounding sphere is located.

25. The non-transitory computer-readable medium of claim 24, wherein the cell ID number corresponding to the cell in the 3D array of cells within which the centroid of the second bounding sphere is located is the same as the cell ID number corresponding to the another cell in the 3D array of cells within which the portion of the first bounding sphere is located, thereby indicating that the centroid of the second bounding sphere and the portion of the first bounding sphere are located within a same cell in the 3D array of cells and that the same cell is a collision cell.

26. A non-transitory computer-readable medium including instructions that, when executed by a processing unit, cause the processing unit to perform a collision detection analysis for a plurality of graphics objects, by performing the steps of:
 initializing a cell identifier (ID) array that includes memory space for entries corresponding to a first bounding sphere associated with a first graphics object and entries corresponding to a second bounding sphere associated with a second graphics object;
 generating an unsorted cell ID array that includes one or more entries corresponding to the first bounding sphere and one or more entries corresponding to the second bounding sphere, wherein each entry in the unsorted cell ID array includes a cell ID number and an object ID;
 generating a sorted cell ID array based on the cell ID number associated with each entry in the unsorted cell ID array;
 generating a collision cell list based on the sorted cell ID array;
 setting a cell type to a first cell type;
 traversing the collision cell list with a plurality of threads to perform a narrow phase collision detection analysis on each collision cell included in the collision cell list having only the first cell type; and
 generating a three-dimensional (3D) array of cells, wherein a centroid of each of the first bounding sphere and the second bounding sphere is located within one of the cells of the 3D array, wherein the step of generating the unsorted cell ID array comprises:
  determining one or more cells in the 3D array of cells that include the centroid of the first bounding sphere or any other portion of the first bounding sphere, and generating a different cell ID array entry corresponding to each of the one or more cells; and
  determining one or more cells in the 3D array of cells that include the centroid of the second bounding sphere or any other portion of the second bounding sphere, and generating a different cell ID array entry corresponding to each of the one or more cells.

27. The non-transitory computer-readable medium of claim 26, wherein a different thread is assigned to each of the first graphics object and the second graphics object for generating the unsorted cell ID array.

28. The non-transitory computer-readable medium of claim 26, wherein the step of generating the sorted cell ID array comprises performing two sorting passes over the unsorted cell ID array, the first sorting pass comprising a radix sort operation that sorts the cell ID array entries according to whether the entries correspond to home cells or phantom cells in the 3D array of cells to generate an intermediate list, and the second sorting pass comprising a radix sort operation that sorts the intermediate list according to the cell ID number associated with each of the cell ID array entries.

* * * * *